United States Patent
Jinzenji et al.

(10) Patent No.: US 6,977,664 B1
(45) Date of Patent: Dec. 20, 2005

(54) METHOD FOR SEPARATING BACKGROUND SPRITE AND FOREGROUND OBJECT AND METHOD FOR EXTRACTING SEGMENTATION MASK AND THE APPARATUS

(75) Inventors: Kumi Jinzenji, Yokosuka (JP); Shigeki Okada, Yokosuka (JP); Hiroshi Watanabe, Kamakura (JP); Naoki Kobayashi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 222 days.

(21) Appl. No.: 09/667,097

(22) Filed: Sep. 21, 2000

(30) Foreign Application Priority Data

| Sep. 24, 1999 | (JP) | ................................ 11-271142 |
| Sep. 24, 1999 | (JP) | ................................ 11-271143 |
| Jul. 31, 2000 | (JP) | ............................ 2000-232226 |

(51) Int. Cl.[7] .............................................. G09G 5/00
(52) U.S. Cl. ...................... 345/629; 345/634; 382/243; 382/236; 375/240.08
(58) Field of Search ............................... 345/629, 683, 345/620; 382/107, 236, 243; 375/240.08, 375/2

(56) References Cited

U.S. PATENT DOCUMENTS

| 5,778,098 | A | * | 7/1998 | Lee et al. .................... 382/236 |
| 6,088,392 | A | * | 7/2000 | Rosenberg ............. 375/240.03 |
| 6,205,260 | B1 | * | 3/2001 | Crinon et al. ............... 382/284 |
| 6,249,613 | B1 | * | 6/2001 | Crinon et al. ............... 382/236 |
| 6,256,409 | B1 | * | 7/2001 | Wang ......................... 382/170 |
| 6,259,828 | B1 | * | 7/2001 | Crinon et al. ............... 382/305 |
| 6,411,326 | B1 | * | 6/2002 | Tabata ......................... 348/47 |

FOREIGN PATENT DOCUMENTS

| WO | 98/29834 | 7/1998 |

OTHER PUBLICATIONS

Lee et al., A Layered Video Object Coding System Using Sprite and Affine Motion Model, Feb. 1997, IEEE Transactions on Circuits and System for Video Technology, vol. 7, pp. 130-145.*

Haskell et al., Image and Video Coding- Emerging Standards and Beyond, Nov. 1998, IEEE Transactions on Circuits and System for Video Technology, vol. 8, pp. 814-837.*

Etoh et al., Template-Based Video Coding with Opacity Representation, Feb. 1997, IEEE Transactions on Circuits and System for Video Technology, vol. 7, pp. 172-180.*

(Continued)

*Primary Examiner*—Sumati Lefkowitz
*Assistant Examiner*—Motilewa Good-Johnson
(74) *Attorney, Agent, or Firm*—Kenyon & Kenyon

(57) ABSTRACT

A method is provided for extracting a foreground object and a background sprite, wherein a provisional sprite is generated, the foreground and the background is separated on the basis of the provisional sprite, and the background sprite is generated. Another method is provided for extracting a segmentation mask by using a difference image, including a first step of regarding each of first macro-blocks as the foreground when an value of the first macro-block is larger than a first predetermined value and a second step of regarding each of second macro-blocks as the foreground when an value of the second macro-block is larger than a second predetermined value, the second macro-block being close to a macro-block which is determined as the foreground in the first step.

45 Claims, 20 Drawing Sheets

OTHER PUBLICATIONS

Siggelkow et al., Segmentation of Image Sequences for Object Oriented Coding, IEEE 1996, pp. 477-480.*

K. Jinzenji et al., "Automatic VOP Generation Scheme and MPEG-4 Video Coding", PCSJ99, pp. 73-74, Sep. 27, 1999, English abstract provided.

K. Jinzenji, et al., "Automatic Two-layer VOP Generation and Its Application to MPEG-4 Video Coding", Technical Report of IEICE, CS99-135, IE99-115, pp. 49-54, Dec. 1999, English abstract provided.

"All of MPEG-4", pp. 38-116, kougyou chousakai.

* cited by examiner

TEXTURE

SHAPE

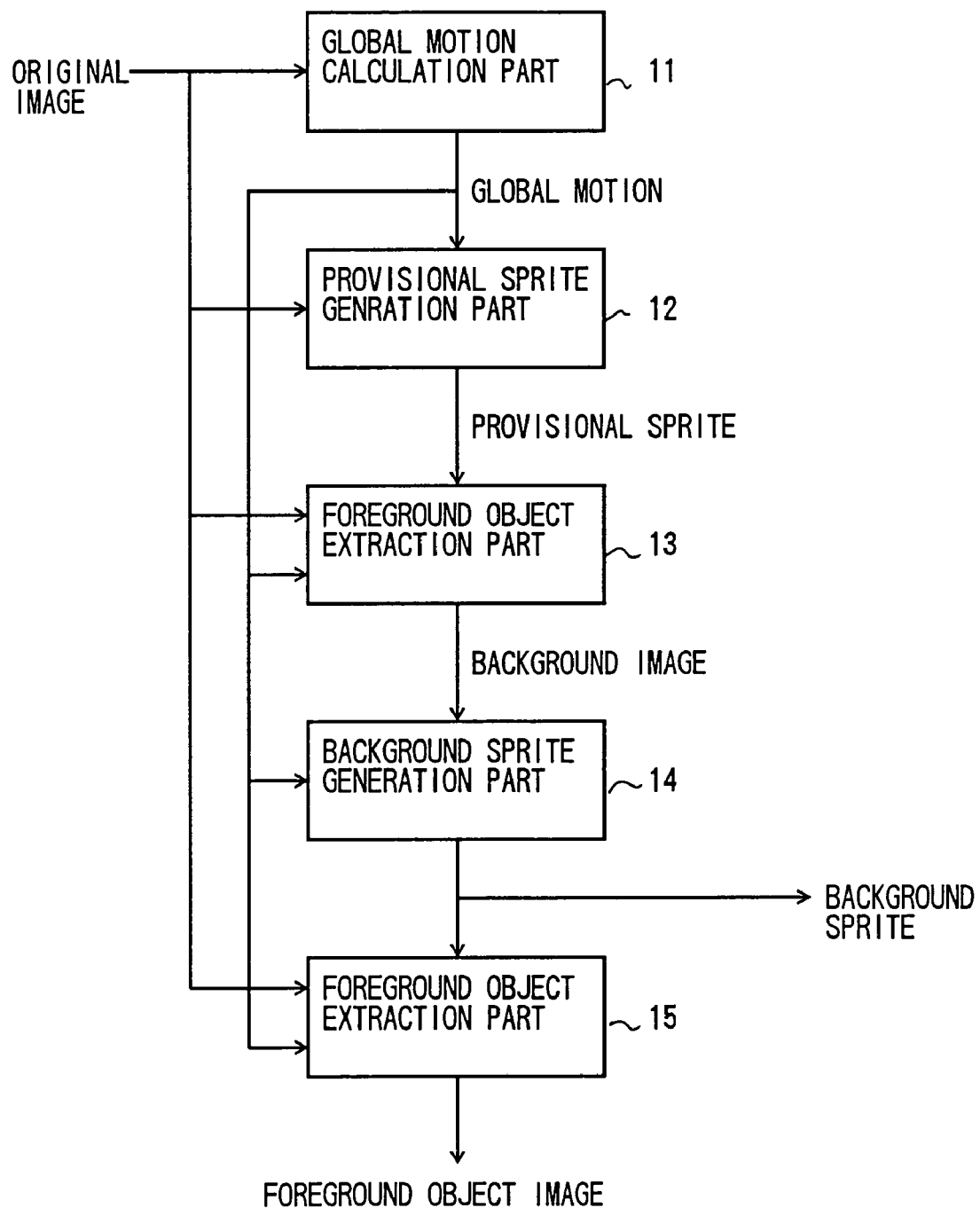

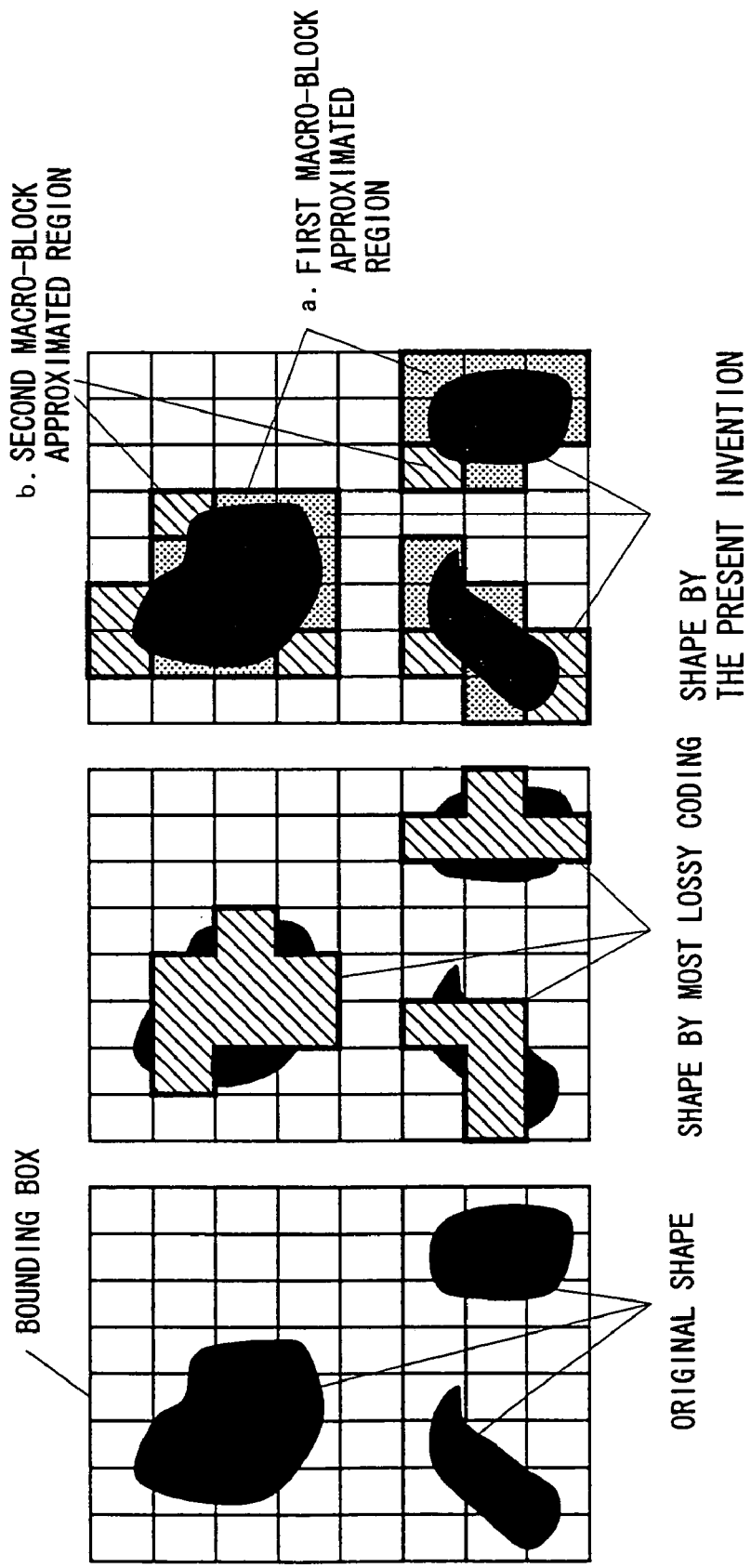

METHOD FOR SEPARATING BACKGROUND SPRITE AND FOREGROUND OBJECT AND METHOD FOR EXTRACTING SEGMENTATION MASK AND THE APPARATUS

BACKGROUND OF THE INVENTION

1. Field of the Invention

The present invention relates to a technique for separating a foreground object and a background sprite by using the sprite coding method which is an object coding method in MPEG-4. More particularly, the present invention relates to a technique for separating and extracting the foreground object from the background sprite, wherein the technique is supported by the sprite coding which represents a background object as a panoramic image. In this technique, the sprite coding is an object coding supported by MPEG-4 Version 1 Main Profile where coding is performed for each object.

In addition, the present invention relates to a segmentation mask extraction technique for generating a segmentation mask which is one of shape object representations, which are a texture map and the segmentation mask, in MPEG-4.

2. Description of the Related Art

In the description of this specification, a moving object will be described as a foreground object, and a background panorama will be described as a background sprite.

As for the technique for separating the foreground object and the background object, there are following techniques for extracting the foreground object from the background object.

A first method is as follows. An object such as a person is placed in front of a background which is colored with a uniform color. Then, the foreground object such as the person is extracted by using a chroma key technique.

A second method is as follows. A rough outline is manually specified beforehand. Then, it is determined whether a pixel around the outline is a foreground or a background.

A third method is that, a moving area outline is specified by obtaining differences between frames of an image taken by a fixed camera such that the inside of the outline is judged as the foreground and the outside is judged as the background.

There are following techniques for extracting the background sprite.

A first method is as follows. A global motion between adjacent frames is calculated as a common preprocess for generating a sprite, and then, transformation from standard coordinates (absolute global motion) is calculated. After that, a median or an average value is calculated in the time direction for frames which are aligned by using the absolute global motion.

A second method is as follows. After performing the preprocess, frames are aligned by using the absolute global motion, and then, frames are overwritten, or, underwritten (an area where a pixel value is not decided is filled).

However, there are two problems in the above-mentioned first method for extracting the foreground object. The first problem is that the method can not be applied to an existing image. The second problem is that the method requires a large-scale apparatus for the chroma key.

The second method for extracting the foreground object has a problem in that it is not suitable for a real-time application since it requires manual processing.

The third method for extracting the foreground object has a problem in that the outline information of the foreground object can not be obtained when a camera moves (such as panning, tilting) since the third method is based on calculating the differences between frames. In addition, even when frames are aligned such that camera movement is canceled before calculating differences, the camera movement can not be canceled completely. Thus, difference value appears in an area other than the foreground object. Therefore, the third method has a problem in that the outline can not be specified.

The first method for extracting the background sprite has a problem in that, when there is an error to a certain degree in the global motion, quality of the sprite is degraded since small deviation from alignment occurs in the frames.

The second method for extracting the background sprite has a problem in that a foreground of an image which is placed most to the front remains in the sprite even though the quality of the sprite is good.

In the following, techniques for generating a foreground object shape as a segmentation mask which is one of the shape object representations, which are a texture map and the segmentation mask, in MPEG-4 will be described.

As a conventional foreground object generation method, there is a technique in that differences between a background image and an arbitrary original image are processed by using a threshold operation, and, then, coordinates where the difference is bigger than a threshold are regarded as included in a moving object, that is, a foreground image. First, the object coding in MPEG-4 which is used for the technique will be described.

In MPEG-4, a foreground object of an arbitrary shape can be encoded. A foreground object can be represented by a pair of the texture map and the segmentation mask. There are two kinds of segmentation masks, that is, a multiple-valued shape which represents also transparency and a binary shape which does not represent the transparency. Only the binary shape will be concerned here. In the texture map, a brightness signal (Y signal) and a color-difference signal (Cb, Cr signal) which are used in conventional methods (MPEG 1, 2 and the like) are assigned to an area where an object exist. In the segmentation mask, 255 is assigned to an object area and 0 is assigned to other areas.

In a pixel (coordinates), three kinds of pixel values are assigned for the texture and one kind of pixel value (which will be called an alpha value) are assigned for the shape, that is, four kinds of pixel values are assigned. In order to distinguish the kinds, the pixel for the texture will be called a texture pixel and the pixel for the shape will be called a shape pixel. The texture pixel can take values ranging from 0 to 255. The shape pixel can take values of 0 or 255. FIG. 1A shows an example of the texture representation, and, FIG. 1B shows an example of the segmentation mask representation.

In the following, shape coding in MPEG-4 will be described. The following description is known to a person skilled in the art as the shape coding in MPEG-4. (A reference book, "All of MPEG-4", pp. 38–116, kougyou chousakai, can be referred to for detailed information.)

Coding of a shape is performed by unit of a macro-block which is s pixels×s pixels. The macro-block can take any size such as 8 pixels×8 pixels and 16 pixels×16 pixels. There are two kinds of shape coding, which are loss less (reversible) and lossy (nonreversible). In the most lossy coding, amount of coding bits is smallest since the shape is approximated to the macro-block unit. More specifically, when equal to or more than half of pixels in the macro-block have the value of 255, that is, when equal to or more than half of the area of the macro-block is filled by an object shape, 255 is assigned to all pixels in the macro-block. In other cases, 0 is assigned to all pixels in the macro-block.

FIGS. 2A and 2B show an example of the above-mentioned macro-block approximation. FIG. 2A shows an original shape and FIG. 2B shows a typical example of the macro-block approximation for the foreground object extraction using the most lossy coded background image.

In the following, an example using the MPEG-4 object coding will be described. An original image will be divided into foreground objects and background objects. In addition, the background object is represented by a panoramic static image which is called a sprite (which is the above-mentioned background sprite). Then, the foreground object is encoded for the shape and the texture and the MPEG-4 sprite coding is performed on the background sprite. (The above-mentioned "All of MPEG-4" can be referred to for detailed information.) Accordingly, in comparison with MPEG-4 simple profile coding (conventional coding based on MC+DCT) without dividing an image into the foreground object and the background sprite, the same level of image quality can be achieved with smaller amount of coding bits.

However, the above-mentioned MPEG-4 shape coding has following problems.

First, amount of shape coding bits becomes large in the loss less coding and in the lossy coding having high degree of precision when the shape is complex. Especially, this tendency is strong when a foreground object is automatically generated.

Second, a process for supplying texture pixels which is called "padding" is necessary for decoding a shape in the loss less coding and in the lossy coding having high degree of precision, which needs large cost for decoding. This causes a problem for realizing real time decoding by software.

Third, by using the lossy coding of the least amount of coding bits, even though the above-mentioned two problems can be avoided, the shape is eroded into the inside of the object such that the shape is not good to look at as shown in FIG. 2B.

Fourth, when the MPEG-4 object coding is used for the foreground and the sprite coding is used for the background, it is when the area ratio of the foreground part to the entire image is equal to or smaller than a certain value that amount of coding bits can be decreased dramatically. Thus, there is a problem in that the amount of coding bits increases when the area ratio is more than the certain value.

SUMMARY OF THE INVENTION

The first object of the present invention is providing a technique for generating a good-quality background sprite which includes no foreground part, wherein the foreground object and the background sprite are automatically extracted without the large-scaled chroma key and without the manual processing, and a robust processing method which is insensitive to camera movement is realized.

A second object of the present invention is providing a technique for extracting the segmentation mask for enabling macro-block based shape approximation which requires small amount of shape information and which decreases erosion of the foreground, wherein the segmentation mask is extracted by using a difference image between a background image and an arbitrary original image. In addition, a further object in relation to the second object is providing a technique for extracting the segmentation mask by controlling a foreground area ratio.

The above-mentioned first object of the present invention is achieved by a foreground object and background sprite separation and extraction method for extracting a foreground object and a background sprite, including the steps of:

obtaining a global motion for transforming a coordinate system between a reference frame and a frame for each of frames in a moving image;

mapping an original image corresponding to the frame into a reference coordinate system for each of frames by using the global motion, and obtaining a pixel value at a point in the reference coordinate system from pixel values of pixels which exist in the same point;

generating a provisional sprite where foreground objects are deleted;

cutting out a first image from the provisional sprite by using the global motion;

obtaining a difference image between the first image and the original image;

extracting a foreground object image as a region in the difference image where each difference value in the region is equal to or higher than a threshold, and extracting other region as a background image;

mapping the background image to the reference coordinate system by using the global motion for the each of frames by inserting a new pixel in a point where a pixel value is not yet decided, or by overwriting a pixel, for generating and outputting the background sprite.

The above-mentioned method may further includes the steps of:

cutting out a second image from the background sprite by using the global motion;

obtaining a difference image between the second image and the original image;

extracting a foreground object image as a region in the difference image where each difference value in the region is equal to or higher than a threshold.

According to the above-mentioned invention corresponding to the first object, the global motion is calculated, each original image of frames is mapped to the reference frame coordinate system by using the global motion, a pixel value of each point is obtained from a plurality of pixels which exist the same each point, the provisional sprite where the foreground object is deleted is generated, an image is cut out from the provisional sprite by using the global motion, a difference value is calculated for each pixel between the cut out image and the original image, a part in the original image is extracted as the foreground object wherein each of the difference values of pixels corresponding to the part is larger than a threshold, other parts is cut out from the provisional sprite as an background image, and mapping the background image to the reference coordinate system by using the global motion for each of frames by inserting a new pixel in a point where a pixel value is not yet decided, or by overwriting a pixel. Then, the background sprite can be generated and output.

In addition, by extracting the foreground object by using difference values between the image cut out from the background sprite and the original image, the background sprite can be extracted robustly to deviation of the global motion and noise.

The above-mentioned second object of the present invention is achieved, first, by a segmentation mask extraction method in object coding in moving image coding, including the steps of:
receiving a foreground mask image where a foreground part is represented by a first value and a background part is represented by a second value;
providing a first value as an alpha value to all shape pixels in each of first macro-blocks when the number of pixels of the foreground part in the first macro-block is equal to or larger than a first predetermined value n (n≧1);
providing the first value as the alpha value to all shape pixels in each of second macro-blocks when the number of pixels of the foreground part in the second macro-block is equal to or larger than a second predetermined value m (m<n), wherein the second macro-block is close to the first macro-block where the first value is provided; and
outputting the segmentation mask.

The above-mentioned segmentation mask extraction method may further includes the steps of:
receiving each of third macro-blocks which has been determined as the background part; and
providing the first value to the third macro-block when a difference image between a background image and an original image which correspond to the third macro-block includes a pixel which has a difference value equal to or larger than a threshold. Accordingly, the foreground object can be recovered.

The above-mentioned second object of the present invention is also achieved by a segmentation mask extraction method in object coding in moving image coding, including the steps of:
receiving a foreground mask image;
generating a number map by calculating the number of pixels of a foreground part for each of macro-blocks in the foreground mask image;
initializing a foreground map;
providing a predetermined value to each of positions in the foreground map corresponding to first macro-blocks when a value of the number map corresponding to the first macro-block is equal to or larger than a first predetermined value n (n≧1);
providing the predetermined value to each of positions in the foreground map corresponding to second macro-blocks when a value of the number map corresponding to the second macro-block is equal to or larger than a second predetermined value m (m<n), wherein the second macro-block is close to the first macro-block where the predetermined value is provided; and
generating the segmentation mask from the foreground map and outputting the segmentation mask.

The above-mentioned second object of the present invention is achieved, second, by a segmentation mask extraction method for extracting a segmentation mask by using a difference image between a background image and an image, including the steps of:
obtaining the difference image by calculating an absolute difference between the background image and the image for each pixel;
initializing an energy map for each macro-block of the difference image;
calculating energy values for the each macro-block;
obtaining an average of the energy values;
calculating a foreground ratio which is a ratio of the size of a foreground mask to the size of the image; and
generating the segmentation mask by using the foreground ratio.

The above-mentioned segmentation mask extraction method may further includes the steps of:
obtaining a divided value by dividing the energy value by the average for the each macro-block, and providing 0 as the energy value to the each macro-block when the divided value is equal to or smaller than α (α≧1.0);
obtaining a maximum energy value as a first predetermined value, setting a second predetermined value which is smaller than the first predetermined value, and initializing the foreground map;
initializing a temporary foreground map;
providing a predetermined value to each macro-block position in the temporary foreground map where the energy value is equal to or larger than the first predetermined value;
counting a count number of macro-blocks where the temporary foreground map has the predetermined value;
generating the segmentation mask from the foreground map and outputting the segmentation mask when a value obtained by dividing the count number by the number of all macro-blocks is larger than a third predetermined value which is predetermined, and copying values of the temporary foreground map to the foreground map;
iterating a providing step until a divided number obtained by dividing the count number by the number of all macro-blocks becomes larger than the third predetermined value, wherein the providing step is a step of providing the predetermined value to each macro-block position in the temporary foreground map where the energy value is equal to or larger than the second predetermined value, the each macro-block being close to a macro-block which has the predetermined value in the foreground map;
when the divided number does not become larger than the third predetermined value after iterating the providing step, copying values of the temporary foreground map to the foreground map, updating the first predetermined value and the second predetermined value, and performing the steps after the step of initializing the temporary foreground map.

The above-mentioned second object of the present invention is achieved, third, by a segmentation mask extraction method for extracting a segmentation mask by using a difference image between a background image and an image, including:
a first step of regarding each of first macro-blocks as the foreground when an energy value of the first macro-block which is obtained by the difference image is equal to or larger than a first predetermined value;
a second step of regarding each of second macro-blocks as the foreground when an energy value of the second macro-block is equal to or larger than a second predetermined value, the second macro-block being close to a macro-block which is determined as the foreground in the first step.

The above-mentioned second step can be iterated for predetermined times.

The above-mentioned second object of the present invention is also achieved by a segmentation mask extraction method for extracting a segmentation mask by using a difference image between a background image and an image, including the steps of:
calculating energy values of each macro-block from the difference image and calculating an average of the energy values;

obtaining a divided value by dividing the energy value by the average for the each macro-block, and providing 0 as the energy value to the each macro-block when the divided value is equal to or smaller than a predetermined value;

regarding each of first macro-blocks as the foreground when the energy value of the first macro-block is equal to or larger than a first predetermined value;

iterating, predetermined times, a step of regarding each of second macro-blocks as the foreground when the energy value of the second macro-block is equal to or larger than a second predetermined value, the second macro-block being close to the first macro-block which is determined as the foreground.

According to the present invention corresponding to the second object, a macro-block is regarded as the foreground when the number of foreground shape pixels or the energy value is larger than a respective predetermined value. Then, the same processing is performed by using another predetermined value for macro-blocks close to the macro-block which was determined to be the foreground previously. This process may be iterated until the number of macro-blocks exceeds a predetermined number.

Accordingly, since the shape is simplified, the shape coding bits can be decreased in comparison with the object coding in MPEG-4 coding.

In addition, since there is no hole in an extracted object, a good-looking object can be provided.

BRIEF DESCRIPTION OF THE DRAWINGS

Other objects, features and advantages of the present invention will become more apparent from the following detailed description when read in conjunction with the accompanying drawings, in which:

FIG. 9 is a block diagram of a foreground object and background sprite separation and extraction apparatus according to a second embodiment of the present invention;

FIGS. 11A–11C are figures for explaining macro-block approximation of a foreground shape according to the present invention;

DETAILED DESCRIPTION OF THE PREFERRED EMBODIMENTS

In the beginning, the present invention corresponding to the first object will be described.

Figure 1A:
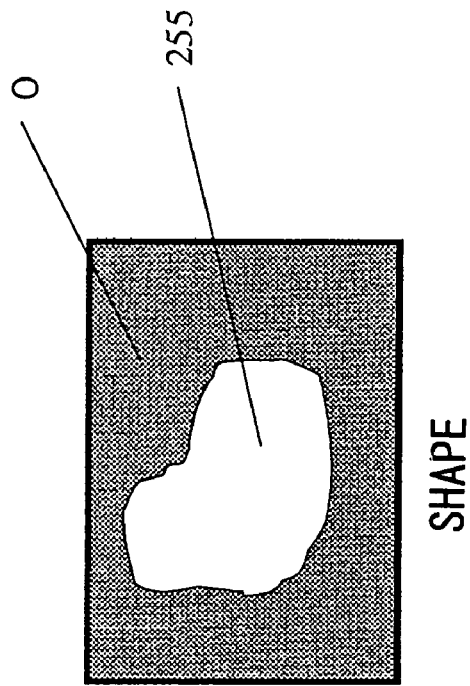
FIGS. 1A and 1B is a figure for explaining an image representation method in MPEG-4.
Figure 1B:
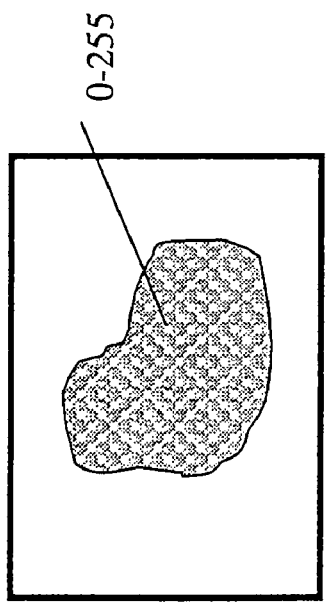
Figures 2A, 2B:
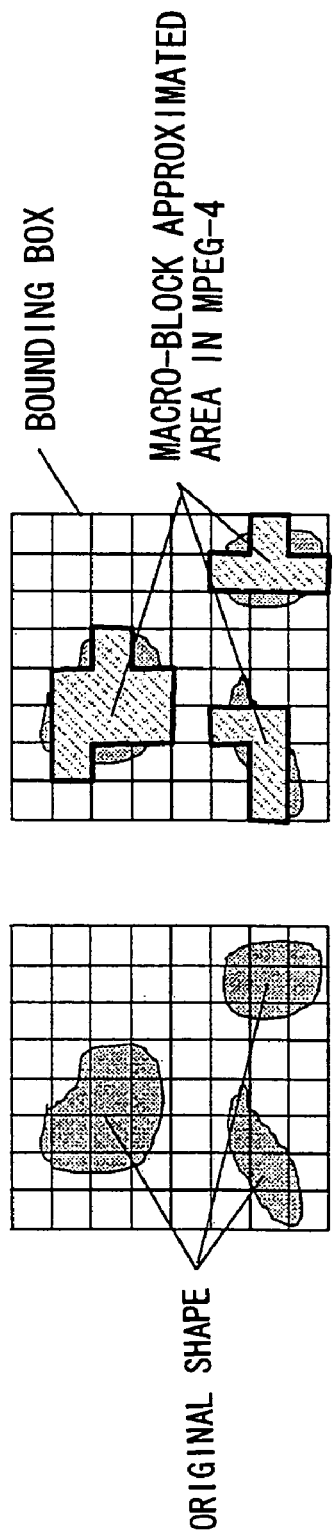
FIGS. 2A and 2B is a figure for conventional macro-block approximation of a shape.
Figure 3:
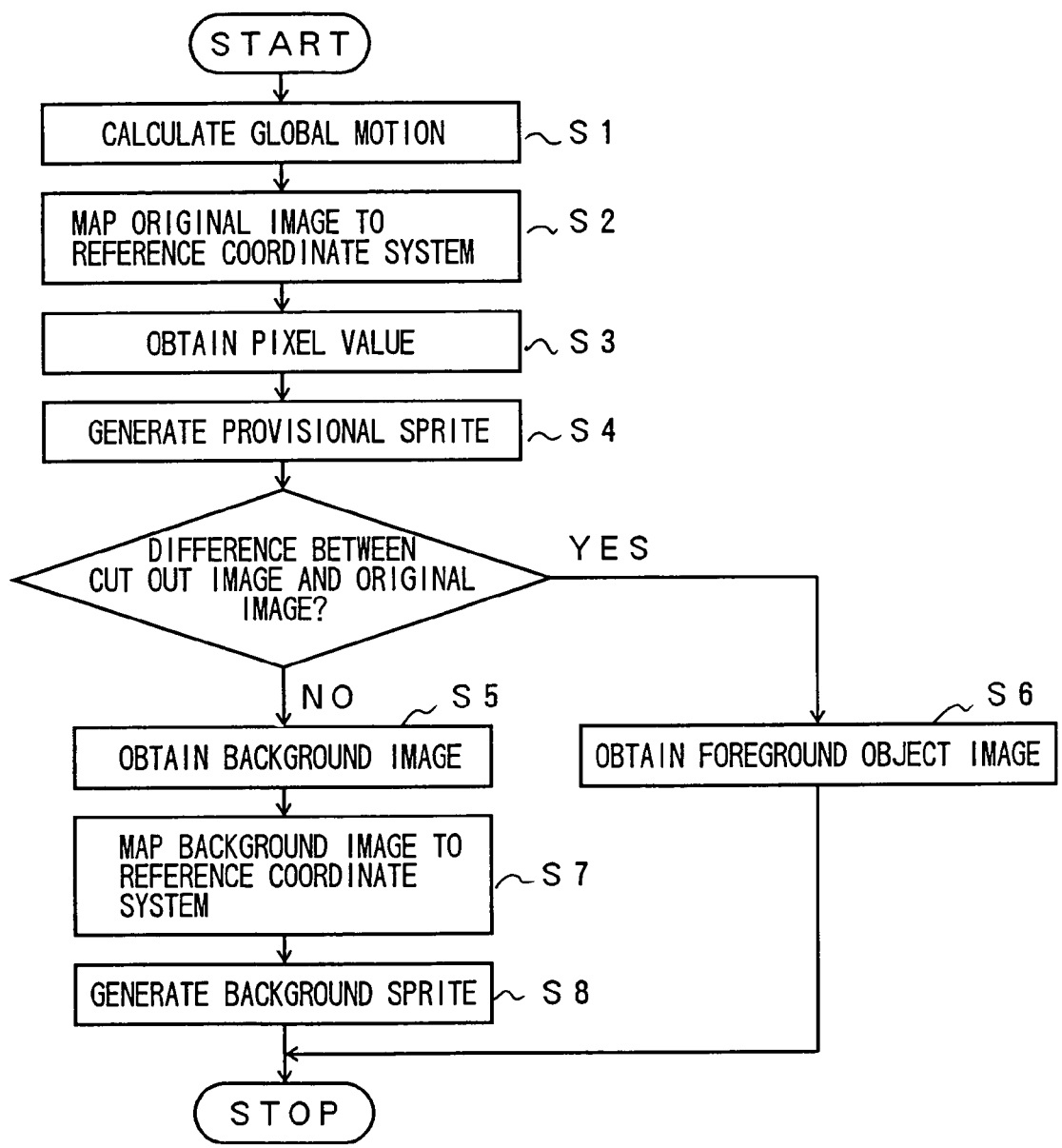
FIG. 3 is a figure for explaining a principle of the present invention corresponding to the first object.

The principle of the present invention corresponding to the aspect of the first object will be described with reference to FIG. 3.

The present invention is a foreground object and a background sprite separation and extraction method for extracting a foreground object and a background sprite from an moving image. In the method, a global motion for transforming coordinates between coordinate systems of a reference frame and an arbitrary frame is obtained in step 1, each original image of the arbitrary frames is mapped to a reference coordinate system which is for the reference frame in step 2, a pixel value of a point is obtained from pixel values which exist in the same point (coordinates) is obtained in step 3, and, then, a provisional sprite (panoramic image) is generated where the foreground object is deleted in step 4. After that, a first image is cut out from the provisional sprite by using the global motion of an arbitrary frame, and a difference image between the first image and the original image is obtained. Then, a foreground object image is extracted as a part in the difference image where each of difference values is equal to or higher than a threshold, and other parts are extracted as a background image in steps 5 and 6. Then, the background image is mapped to the reference coordinate system in step 7 by using the global motion so as to insert a new pixel in coordinates where a pixel value is not yet decided, or so as to overwrite a pixel for generating and outputting the background sprite in step 8.

First Embodiment

Next, a first embodiment of the present invention will be described. This embodiment corresponds to the first object of the present invention.

Figure 4:
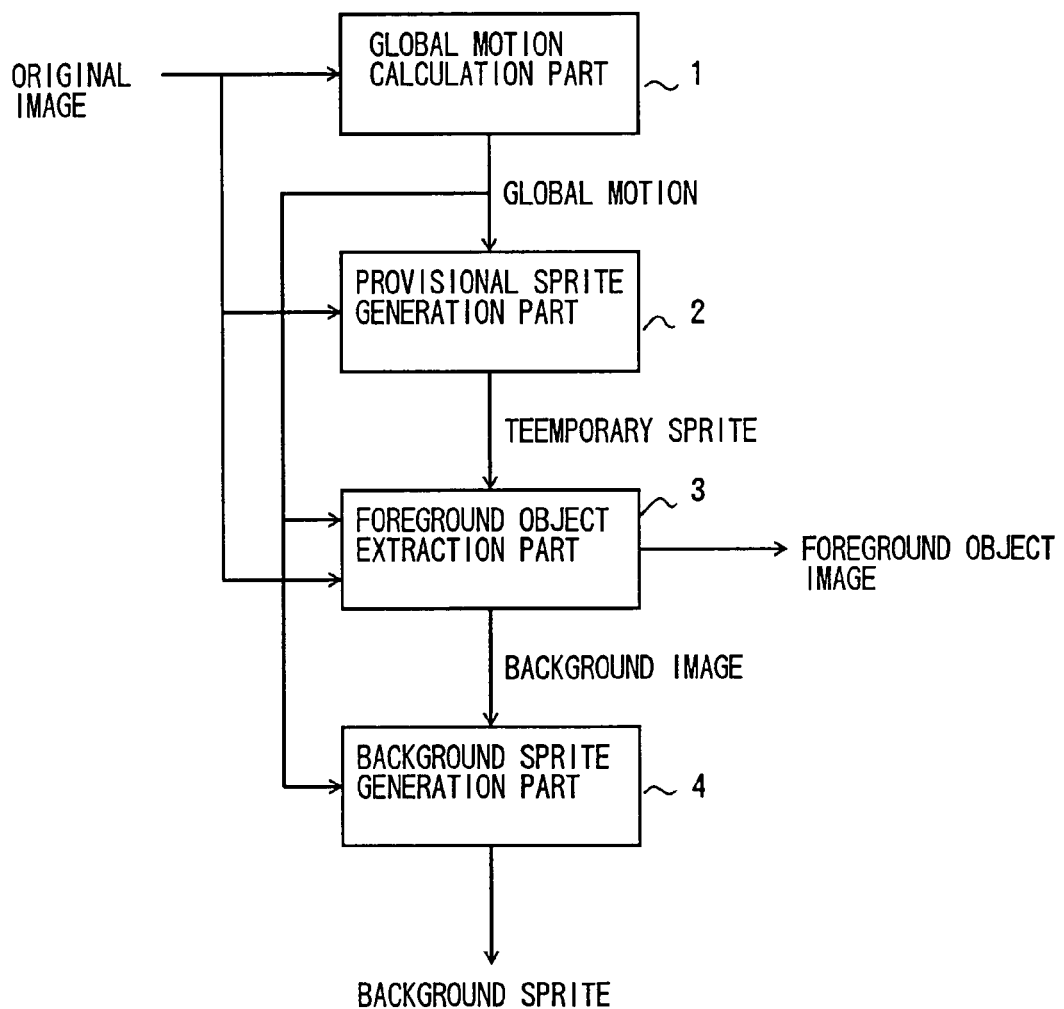
FIG. 4 is a block diagram of a foreground object and background sprite separation and extraction apparatus according to a first embodiment of the present invention.

FIG. 4 is a block diagram of a foreground object and background sprite separation and extraction apparatus of the present invention.

The foreground object and background sprite separation and extraction apparatus includes a global motion calculation part 1, a provisional sprite generation part 2, a foreground object extraction part 3 and a background sprite generation part 4.

The global motion calculation part 1 calculates transformation (global motion) between coordinate systems of the reference frame and an arbitrary frame of an input image (a moving image).

The provisional sprite generation part 2 receives the original image and the global motion from the global motion calculation part 1, maps each original image of arbitrary frames to coordinates of the reference frame (reference coordinates) by using the global motion. Then, the provisional sprite generation part 2 obtains a pixel value of coordinates from a plurality of pixel values which exist at the coordinates such that a sprite (panoramic image) where the foreground object is deleted is generated.

The foreground object extraction part 3 receives the original image, the global motion from the global motion calculation part 1, and the provisional sprite from the provisional sprite generation part 2. Then, the foreground object extraction part 3 cuts out an image from the provisional sprite with the global motion, and extracts parts as the foreground image where the difference between the image and the original image is equal to or larger than a threshold, and extracts other parts as the background image.

The background sprite generation part 4 receives the global motion and receives the background image from the foreground object extraction part 3, maps the above-mentioned background image to the reference coordinate system by using the global motion for each frame by inserting a new pixel only in coordinates in which the pixel value is not decided so as to generate a background sprite. This method for generating the background sprite by inserting a new pixel only in reference coordinates in which the image value is not decided is called an "underwrite" method. The background sprite can be generated by an overwrite method in which pixels of the background image is overwritten on the background sprite.

Accordingly, the foreground object image and the background sprite which is not blurring can be automatically obtained. Sometimes, a part which is not filled remains in the generated background sprite. However, this is not a problem since the foreground object is placed in this part.

In the following, the configuration and the operation of the apparatus shown in FIG. 4 will be described more precisely.

The global motion calculation part 1 calculates the global motion to the reference frame for an arbitrary frame, the global motion representing motion of the whole image using a pair of parameters such as camera motion parameters. Generally, the global motion can be represented by a transformation matrix of a coordinate system. Following is an example.

Coordinate transformation between the coordinate system (x0, y0) of the reference frame and a coordinate system (x1, y1) of a frame A can be represented by the following equation (1) by using following matrices.

$$\text{matrix} \begin{pmatrix} a & b \\ -b & a \end{pmatrix} \text{ and matrix } \begin{pmatrix} c \\ d \end{pmatrix} \quad (1)$$

$$\begin{pmatrix} x_0 \\ y_0 \end{pmatrix} = \begin{pmatrix} a & b \\ -b & a \end{pmatrix} \begin{pmatrix} x_1 \\ y_1 \end{pmatrix} + \begin{pmatrix} c \\ d \end{pmatrix}$$

The global motion is one of input data into the provisional sprite generation part 2.

Figure 5:
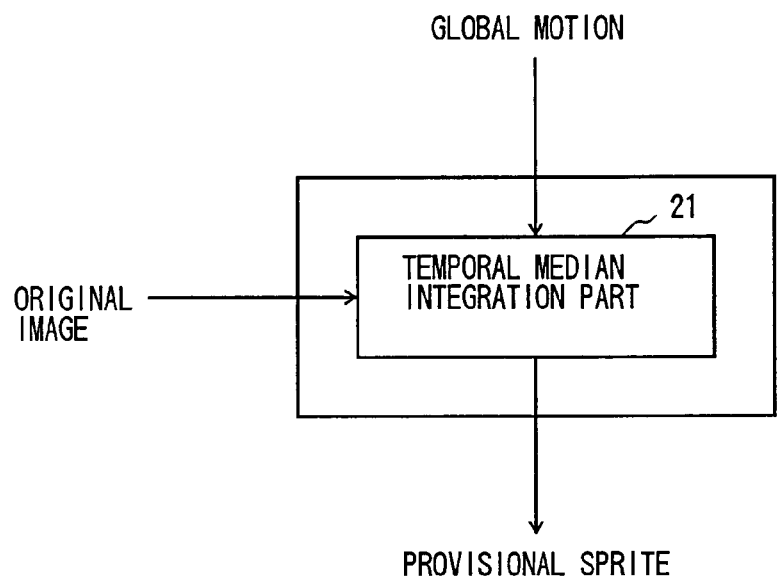
FIG. 5 is a block diagram of a provisional sprite generation part according to the first embodiment of the present invention.

As shown in FIG. 5, the provisional sprite generation part 2 includes a temporal median integration part 21. The temporal median integration part 21 maps the images of each frame into the coordinate system of the reference frame (reference coordinate system) by using the global motion of the each frame. For a plurality of pixels which are mapped to the same coordinates, a median value of the pixels is selected as the value of the coordinates of the provisional sprite. Accordingly, the provisional sprite is generated. By selecting the median value, the provisional sprite can be extracted as a panoramic image without the foreground object. That is, when the number of pixels which represent a moving object is smaller than the number of all pixels of the coordinates, a pixel which represents the moving object is not selected by selecting the median value such that the sprite without any moving object can be generated.

The provisional object without the foreground object which is generated in the provisional sprite generation part 2 is input to the foreground object extraction part 3.

The foreground object extraction part 3 receives the original image, the global motion which is obtained by the global motion calculation part 1, and the provisional sprite which is obtained by the provisional sprite generation part 2. Then, for each frame, the foreground object extraction part 3 outputs a foreground object image and a background image where foreground is deleted.

Figure 6:
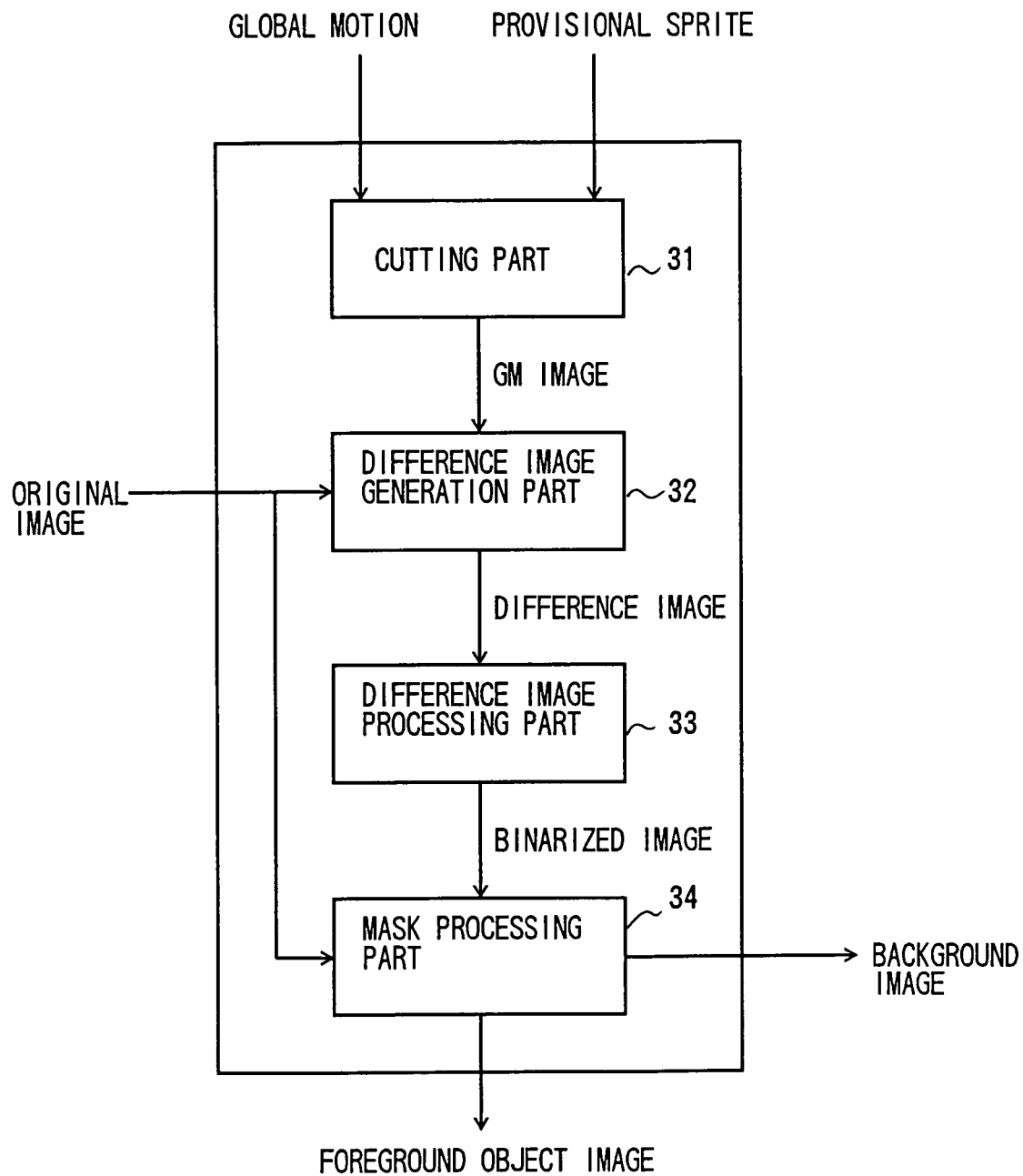
FIG. 6 is a foreground object extraction part according to the first embodiment of the present invention.

FIG. 6 is a block diagram of the foreground object extraction part 3 according to the first embodiment of the present invention. The foreground object extraction part 3 includes a cutting part 31, a difference image generation part 32, a difference image processing part 33, a mask processing part 34.

The cutting part 31 receives the provisional sprite and the global motion of an arbitrary frame so as to cut an image from the provisional sprite. This image is called a GM image.

The difference image generation part 32 receives the GM image cut by the cutting part 31 and the original image for an arbitrary frame. Then, the difference image generation part 32 outputs a difference image. An absolute difference value between pixel values of the GM image and the original image at corresponding coordinates is adopted as the above-mentioned difference.

The difference image processing part 33 outputs a binary image. In this embodiment, the difference image processing part 33 receives the difference image from the difference image generation part 32. Then, the difference image processing part 33 assigns 1 to a pixel in the difference image when the difference value of the pixel is higher than a threshold and assigns 0 in other cases so as to output the binary image.

The mask processing part 34 receives the original image and receives the binary image from the difference image processing part 33, then outputs a foreground object image. The foreground image has a value of the original image at a part corresponding to a part of the binary image having the pixel value 1, and has 0 in other part. In addition, the mask processing part 34 outputs a background image. The background image has a value of the original image at a part corresponding to a part of the binary image having the pixel value 0, and has 1 in other part. The background image is input into the background sprite generation part 4.

The background sprite generation part 4 receives the background image from the foreground object extraction part 3 and receives the global motion from the global motion calculation part 1. The background sprite generation part 4 has an overwrite/underwrite integration part 41 as shown in FIG. 7.

Figure 7:
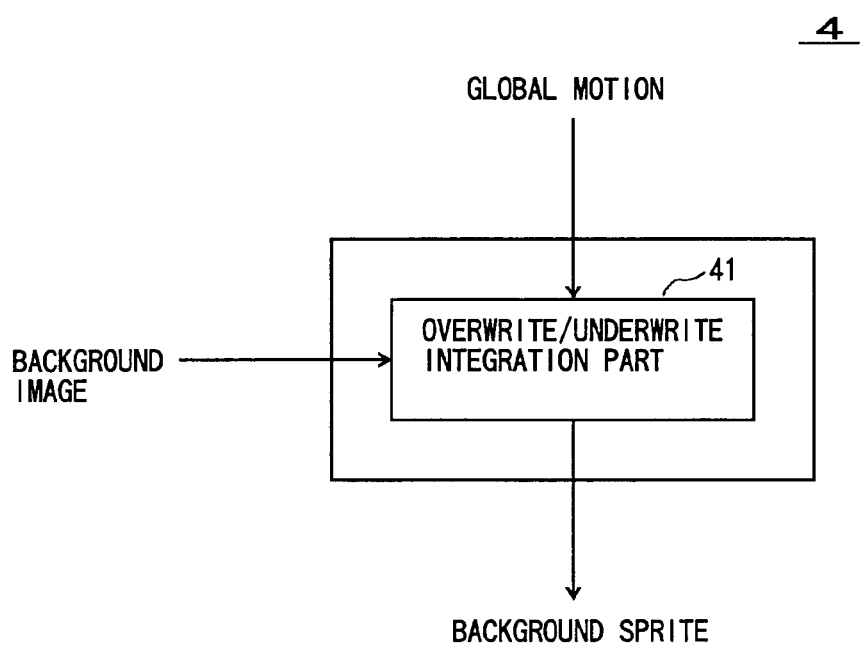
FIG. 7 is a block diagram of a background sprite generation part according to the first embodiment of the present invention.

FIG. 7 shows a block diagram of the background sprite generation part according to the first embodiment of the present invention. The overwrite/underwrite integration part 41 receives the global motion and the background image, and maps the background image in positions in the reference coordinate system which are calculated from the global motion and coordinate values of the background image. The overwrite/underwrite integration part 41 performs the above processing by using the overwrite method or the underwrite method. For example, when using the underwrite method, a value is inserted only in positions in the reference coordinate system (a pixel value undecided area) where a pixel value for each position is not decided. Accordingly, a pixel value decided area shown in FIG. 8 is generated as the background sprite.

Figure 8:
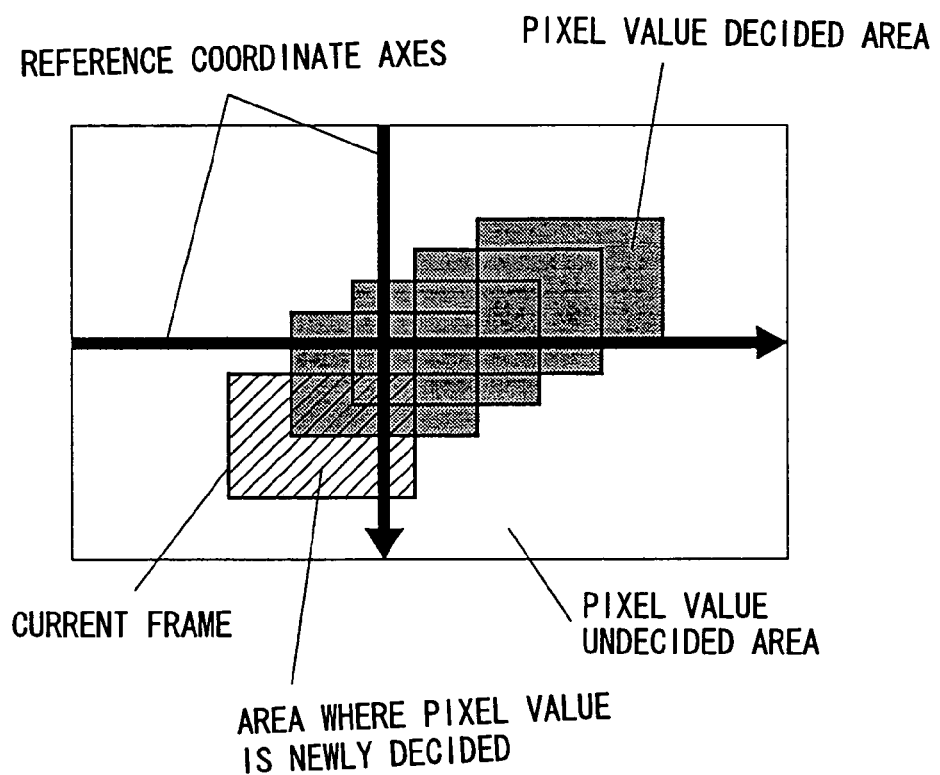
FIG. 8 is a figure for explaining an operation of an overwrite/underwrite integration part.

That is, as shown in FIG. 8, the pixel value is decided one after another by placing the image in the pixel value undecided area from the top right-hand of the figure. The part in the bottom left is a current frame which shows a part where new pixel values will be decided. In this way, the pixel value undecided part is filled.

As mentioned above, the temporary background sprite is generated. Then, after separating the foreground and the background for each image on the basis of the temporary background sprite, the background sprite is generated on the basis of the separated background. By performing this processing, a clear background sprite which has no blur can be obtained.

Second Embodiment

FIG. 9 shows a block diagram of an extraction apparatus according to a second embodiment of the present invention. The second embodiment is another embodiment corresponding to the invention of the first object. The foreground object and background sprite separation and extraction apparatus shown in the figure includes a global motion calculation part 11, a provisional sprite generation part 12, a foreground object extraction part 13, a background sprite generation part 14 and a foreground object extraction part 15. The foreground object and background sprite separation and extraction apparatus shown in the figure is formed by adding the foreground object extraction part 15 to the bottom part of the configuration shown in FIG. 4. The parts of the global motion calculation part 11, the provisional sprite generation part 12, the foreground object extraction part 13 and the background sprite generation part 14 have the same function as corresponding parts shown in FIG. 4, and performs the same processing as the corresponding parts, except that the foreground object extraction part 13 does not output the final foreground object image.

The foreground object extraction part 15 receives the background sprite which is calculated by the background sprite generation part 14, the global motion and the original image, and outputs the foreground object image. The foreground object extraction part 15 performs the same processing as the foreground object extraction part 3 shown in FIG. 4 and the foreground object extraction part 13 shown in FIG. 9.

Accordingly, by performing the foreground object extraction processing two times, a foreground object does not remain in the background sprite. This reason is in the following.

When the background image is calculated from the differences between the GM image and the original image, there may be a case wherein a part of a moving object is not extracted. When this moving area is reflected in the background sprite, the quality of the background sprite and the GM image deteriorates. Here, when the foreground object is calculated from the generated background sprite and the original image once again, the difference between the erroneously extracted part of the background sprite and the correct part of the foreground object becomes large. Therefore, this part becomes the foreground such that the erroneously extracted part is hidden by the foreground. Thus, the foreground does not remain in the background sprite according to the second embodiment.

As mentioned above, according to the first and second embodiments, a large-scale apparatus for the chroma key is not necessary. In addition, an existing image can be used.

Further, a manual processing is not necessary since the foreground object image and the background image can be automatically obtained.

Further, the foreground object can be obtained robustly even when there is deviation of the global motion or noise.

Further, the clear and high-quality background sprite which does not includes the foreground object can be obtained.

In the following, the invention which corresponds to the second object will be described by using third to fifth embodiments.

The invention corresponding to the second object can be applied to the foreground object extraction part explained with the first and second embodiments which corresponds to the first object. That is, in the mask processing part 34 in the foreground object extraction part in FIG. 6 explained with the first embodiment, an segmentation mask is generated by performing after-mentioned initial macro-block approximation and extended macro-block approximation for an input binarized image. Accordingly, a good-looking foreground object image can be extracted with smaller amount of shape coding bits in comparison with a conventional technology.

In the beginning, concepts which is common to the third to fifth embodiments will be described. An object of the third to fifth is to obtain a segmentation mask. For this object, pixel differences are calculated between a background image and an arbitrary original image first. In the following, examples for calculating the differences between the background image and the arbitrary original image will be described with reference to FIGS. 10A and 10B.

Figure 10A:
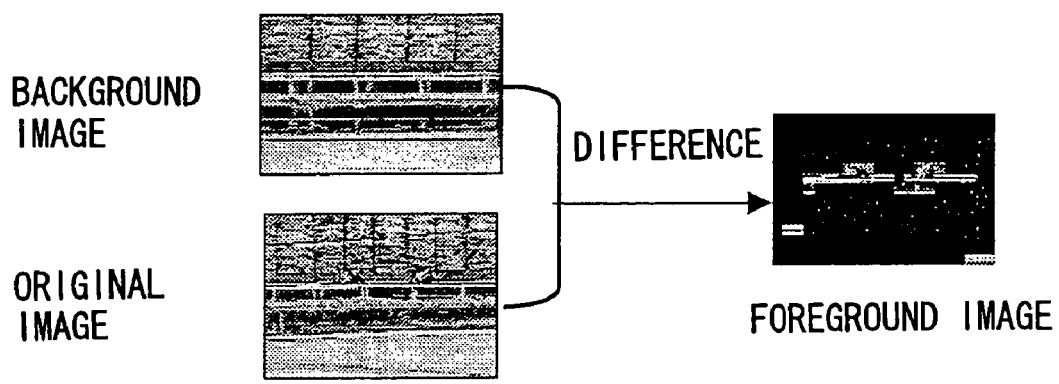
FIGS. 10A and 10B show examples for calculating a difference image between a background image and an original image.
Figure 10B:
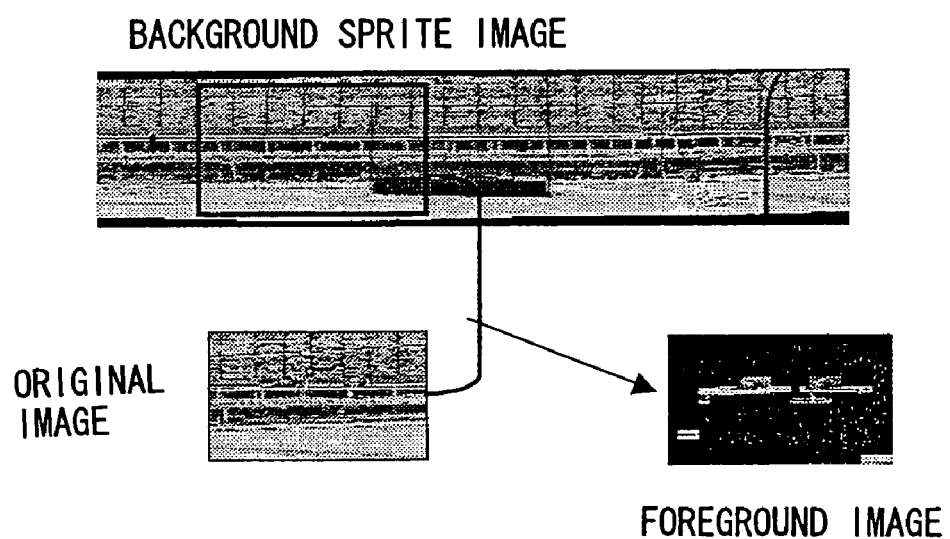

FIG. 10A shows an example for calculating the differences between a normal background image and an arbitrary original image. FIG. 10B shows an example where a background sprite is used instead of the normal background image. In this case, a background part of the arbitrary original image is cut out from the background sprite such that the differences can be obtained. The both method of using the normal background image and using the background object can be applied to this invention.

Next, the concept of the method for obtaining the segmentation mask from the difference image which is obtained in the above-mentioned way will be described with reference to FIGS. 11A–11C.

FIG. 11A shows an original shape and a matrix in the figure shows a bounding box. The bounding box is a region having the least area which covers objects and has a side of a multiple of s pixels long. A block of s pixels×s pixels is called a macro-block in the embodiments. The macro-block may be any size such as 8 pixels×8 pixels and 16 pixels×16 pixels.

FIG. 11B, which shows a conventional method, shows shapes obtained by the most lossy coding. In the conventional method, when an object occupies more than half area of an macro-block in an macro-block, an alpha value 255 is provided to shape pixels of the macro-block. An alpha value 0 is provided in other cases. Therefore, as shown in FIG. 11B, outstanding erosion appears in the shape of the foreground object.

In the present invention, the segmentation mask is extracted by performing two stage macro-block approximation (first macro-block approximation and second macro-block approximation). In the macro-block approximation, it is determined whether a macro-block is the foreground or the background. Then, 255, for example, is provided to the alpha value of the macro-block which is judged as the foreground.

According to the present invention, when a condition of a prescribed method is satisfied, a whole macro-block is regarded as the foreground. This processing is called first macro-block approximation or initial macro-block approximation. In addition, the similar judgment is performed for macro-blocks which are close to the macro-block which was judged as the foreground by the first macro-block approximation. The macro-blocks may be, for example, four neighborhood macro-blocks (for example top and bottom, right and left) around the macro-block which was judged as the foreground by the first macro-block approximation. This processing is called second macro-block approximation or extended macro-block approximation.

The above-mentioned processing will be described with reference to FIG. 11C.

"a" in FIG. 11C shows regions which are approximated to macro-blocks (first macro-block approximated regions) by the initial macro-block approximation, and "b" shows regions which are approximated to macro-blocks (second macro-block approximated regions) by the extended macro-block approximation. In the initial macro-block approximation, for example, when the number of shape pixels of the original shape is equal to or more than a first predetermined value in a macro-block, 255 is provided to each shape pixel of the macro-block as the alpha value, and 0 is provided in other cases. In the extended macro-block approximation, when the number of shape pixels of the original shape is equal to or more than a second predetermined value in a macro-block which is close to (more specifically, next to or adjacent to) the macro-block where 255 was provided by the initial macro-block approximation to each shape pixel, 255 is provided to each shape pixel. As described later, an energy value of a macro-block can be used instead of the number of the shape pixel. In the above-mentioned example, macro-blocks targeted for the extended macro-block approximation is not limited to four macro-blocks which are adjacent to a macro-block where 255 was provided. Any number of adjacent macro-blocks can be used, for example, eight.

As is shown in FIG. 11C, according to the present invention, the erosion of the original shape is decreased. In the following, the invention corresponding to the second object will be described more specifically with reference to third to fifth embodiments.

Third Embodiment

In the beginning, an overview of the third embodiment will be described with reference to FIGS. 12 and 13.

Figure 12:
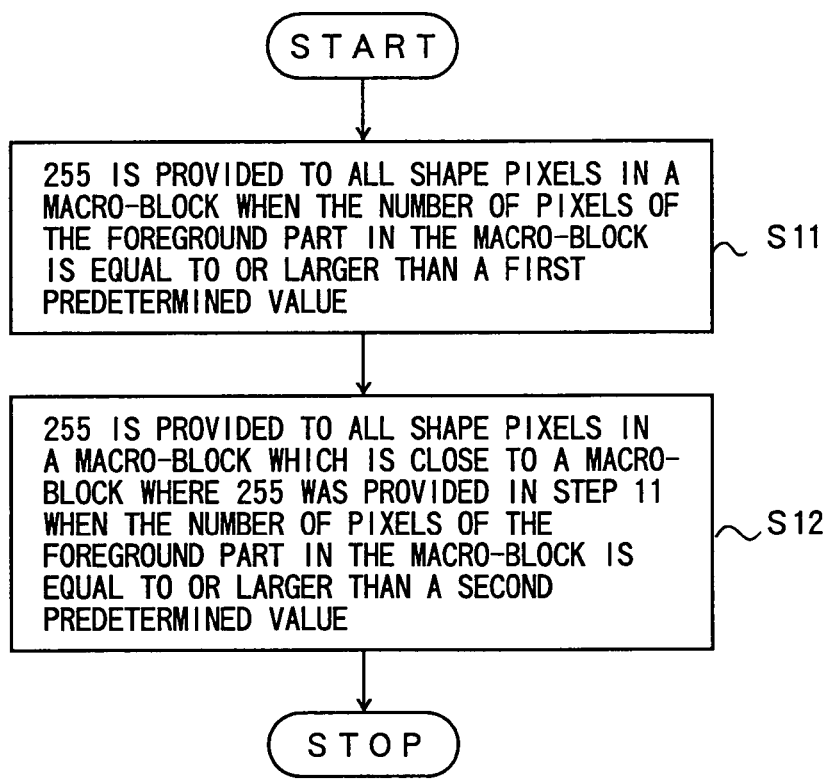
FIG. 12 is a figure for explaining the overview of the process of a third embodiment.

FIG. 12 is a figure for explaining the overview of the process of the present invention. The present invention is a segmentation mask extraction method in object coding in moving image coding. In this method, a foreground mask image where a foreground part is represented by 255 and a background part is represented by 0 is received. Next, 255 is provided as the alpha value to all shape pixels in a first macro-block when the number of pixels of the foreground part in the first macro-block is equal to or larger than a first predetermined value n (n≧1) in step 11. This process is performed for each macro-block. After that, 255 is provided as the alpha value to all shape pixels in a second macro-block which is close to a macro-block where 255 was previously provided when the number of pixels of the foreground part in the second macro-block is equal to or larger than a second predetermined value m (m<n) in step 12. This process is also performed for each second macro-block. Then, the segmentation mask is output.

Figure 13:
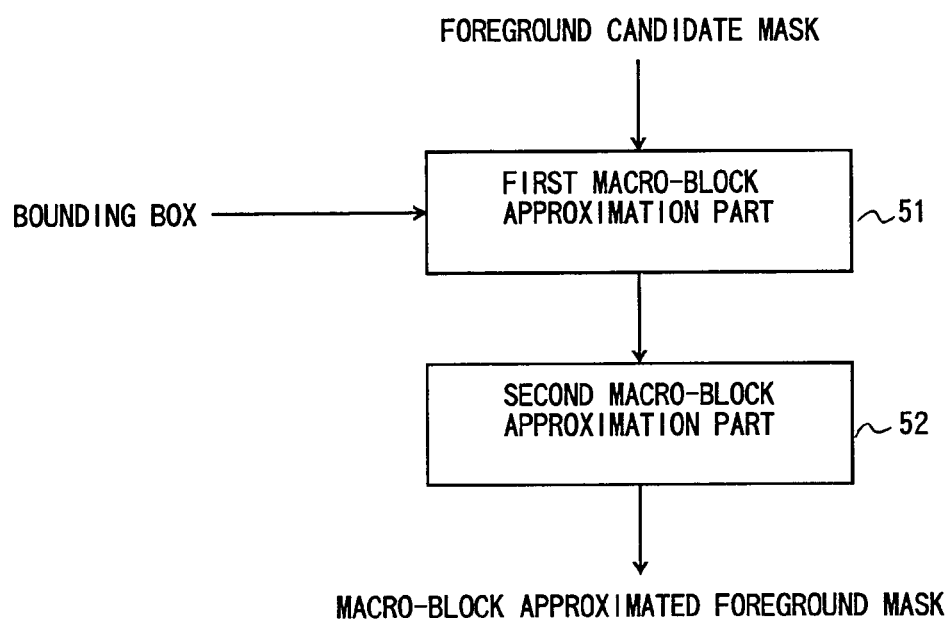
FIG. 13 is a block diagram of main parts of a segmentation mask extraction apparatus according to the third embodiment of the present invention.

FIG. 13 is a block diagram of a segmentation mask extraction apparatus according to the third embodiment of the present invention.

The segmentation mask extraction apparatus includes a first macro-block approximation part 51 and a second macro-block approximation part 52. The first macro-block approximation part 51 receives a foreground mask image where a foreground part is represented by 255 and a background part is represented by 0, provides 255 as an alpha value to all shape pixels in a first macro-block when the number of pixels of the foreground part in the first macro-block is equal to or larger than a first predetermined value n (n≧1). The second macro-block approximation part 52 provides 255 as the alpha value to all shape pixels in a second macro-block which is close to a macro-block where 255 is provided to shape pixels when the number of pixels of the foreground part in the second macro-block is equal to or larger than a second predetermined value m (m<n), and outputs the segmentation mask.

Next, each part will be described in detail.

As mentioned above, the segmentation mask extraction apparatus shown in FIG. 13 includes the first macro-block approximation part 51 and the second macro-block approximation part 52.

The first macro-block approximation part 51 receives a foreground candidate mask (a candidate of a foreground shape) and a bounding box. The first macro-block approximation part 51 provides 255 to shape pixels as the alpha value in a macro-block when the number of shape pixels corresponding to the foreground part in the macro-block is equal to or larger than a first predetermined value n, and it provides 0 in other cases.

The second macro-block approximation part 52 provides 255 to shape pixels in a macro-block close to (more specifically, next to or adjacent to) the macro-block where 255 is provided by the first macro-block approximation part 51 when the number of shape pixels of the foreground part in the macro-block is equal to or larger than a second predetermined value m (the first predetermined value n>the second predetermined value m).

Accordingly, the shape of the object is approximated to rectangles by the first macro-block approximation part 51. Then, the shape in macro-blocks close to a macro-block where 255 is provided is approximated to rectangles by the second macro-block approximation part 52. Accordingly, the second macro-block approximation part 52 outputs the segmentation mask (macro-block approximated segmentation mask).

In the following, the configuration and the operation of the above-mentioned apparatus will be described more specifically.

In the following, an example is shown in which a background image of a moving image is provided beforehand and a difference region between the background image and the original image is regarded as a foreground object. In addition, an example will be described wherein a part for recovering the foreground which has been judged as the background is added to the configuration shown in FIG. 13.

Figure 14:
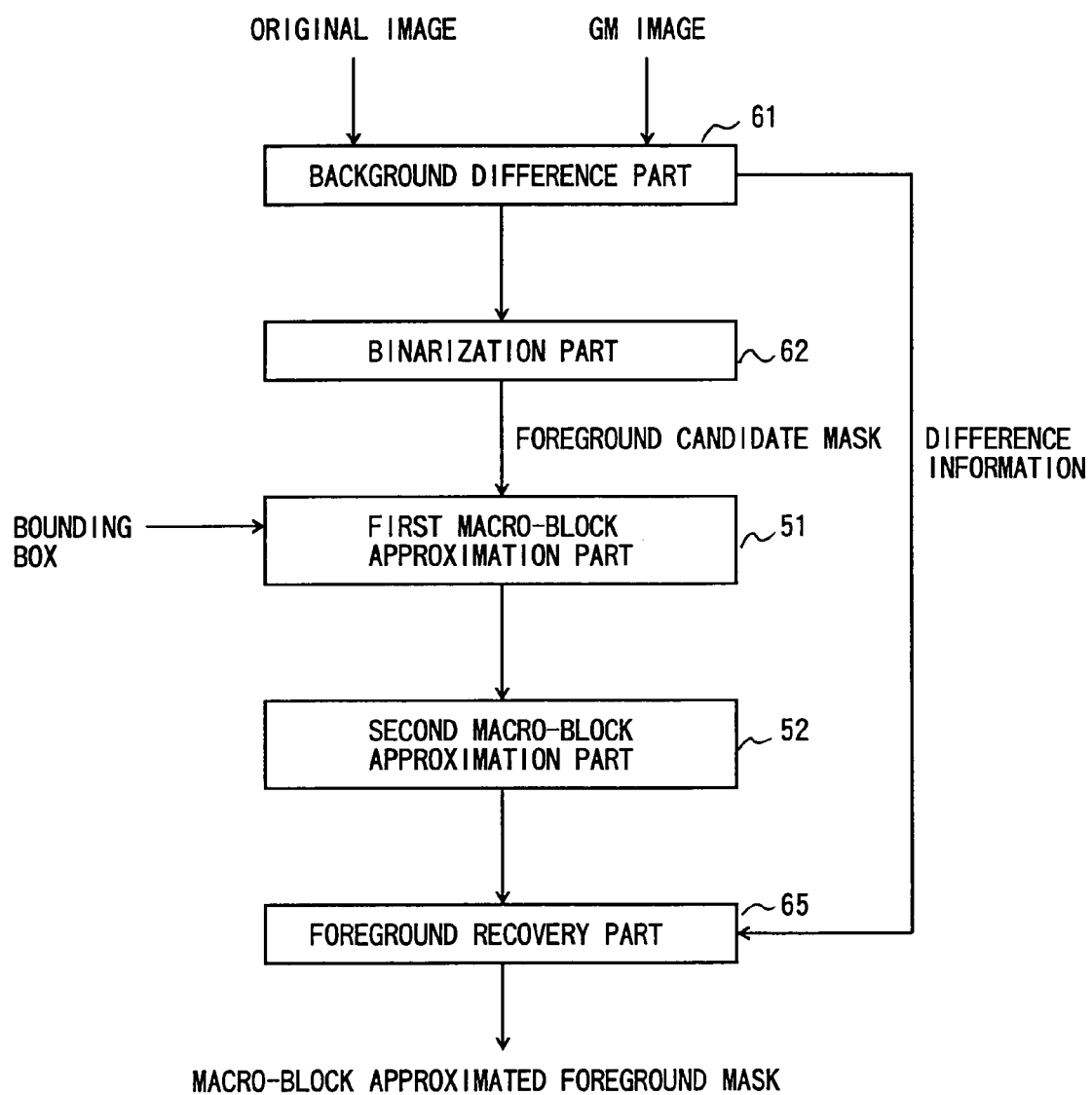
FIG. 14 is a block diagram of the segmentation mask extraction apparatus according to the third embodiment of the present invention.

FIG. 14 shows a detailed configuration of the segmentation mask extraction apparatus of the third embodiment. In the drawings, the same reference numerals is used to identify corresponding features.

The segmentation mask extraction apparatus includes a background difference part 61, a binarization part 62, a first macro-block approximation part 51, a second macro-block approximation part 52 and a foreground recovery part 65.

The background difference part 61 receives the original image and the GM image (background image), obtains a difference image between the original image and the background image and sends the difference to the binarization part 62.

The binarization part 62 binarizes the difference image of the background so as to provide 255 to the foreground part and provide 0 to the background part. Then, the binarization part 62 sends the binarized information to the first macro-block approximation part 51 as the foreground candidate mask.

The first macro-block approximation part 51 and the second macro-block approximation part 52 approximate the original shape to rectangles on the basis of the binarized information from the binarization part 62.

The foreground recovery part 65 regards a macro-block which includes a specific pixel as the foreground wherein 0 has been provided to pixels of the macro-block, then, changes the value of the macro-block into 255. The specific pixel has the difference value larger than a threshold.

Accordingly, a macro-block which has been judged as the background can recover to the foreground.

Modified Third Embodiment

According to the above-mentioned third embodiment, the alpha value of all pixels in a macro-block is decided as 255 or 0 according to whether the macro-block is the foreground or not. The macro-block approximation can be also performed by using undermentioned foreground map (Vmap(i, j)). "(i,j)" represents the position of a macro-block. The foreground map (Vmap(i,j)) has 1 for a macro-block which is judged to be the foreground and has 0 for other macro-blocks. In the following, the modified third embodiment will be described centering on points which are different from the third embodiment.

Figure 15:
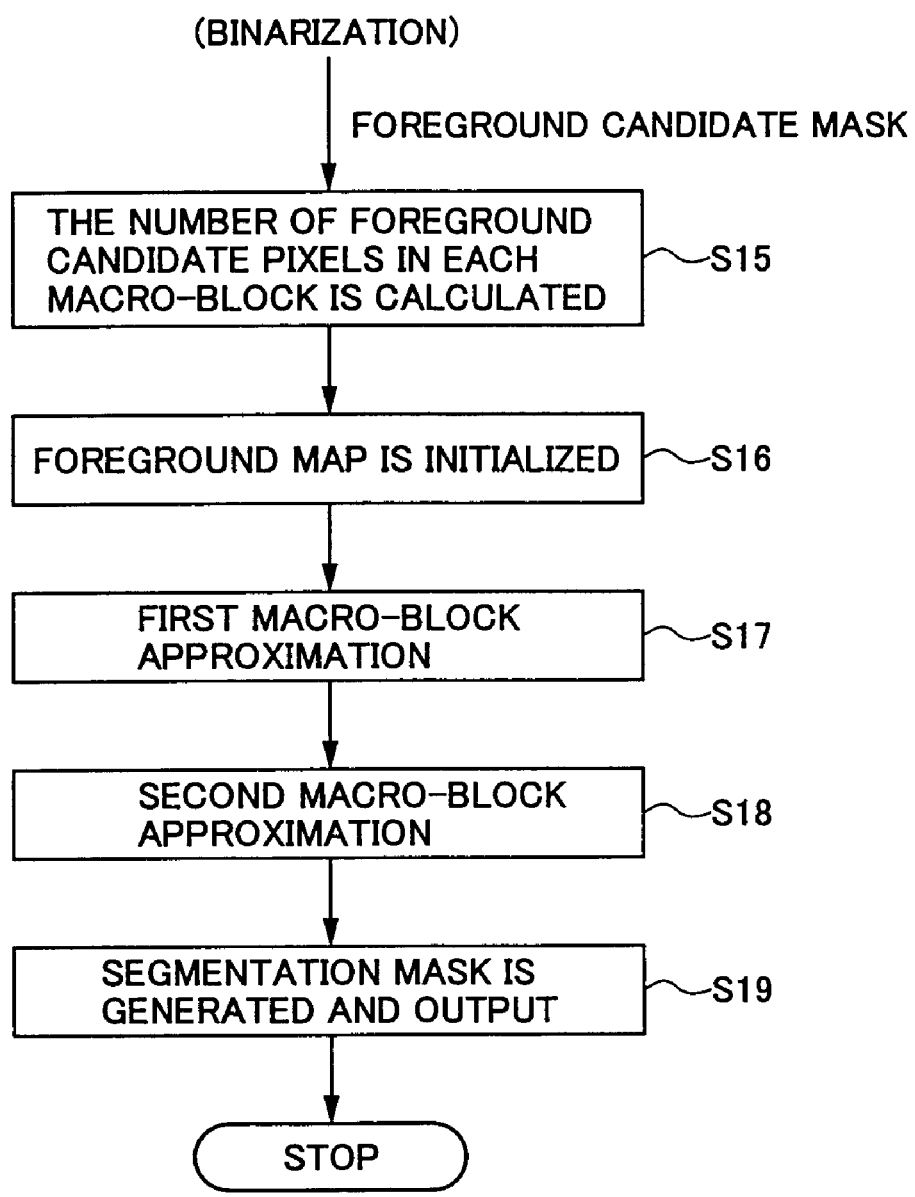
FIG. 15 is a flowchart showing processes according to a modified third embodiment of the present invention.

FIG. 15 is a flowchart showing processes after binarizing the difference image of the background and calculating the foreground candidate mask.

After given the foreground candidate mask, the number of foreground candidate pixels in each macro-block, that is, the number of shape pixels having 255 as the alpha value is calculated in step 15. The result of the calculation is stored in Nmap(i,j)(a number map). Nmap(i,j) has the number of the foreground candidate pixels for each macro-block (i,j).

Next, the foreground map is initialized. That is, Vmap(i, j)=0 is performed in step 16.

Then, in the same way as the third embodiment, the first macro-block approximation (step 17) and the second macro-block approximation (step 18) are performed. In this modified third embodiment, the value of the foreground map (Vmap(i,j)) corresponding to a macro-block which is judged as the foreground becomes 1.

Next, the segmentation mask is generated according to the foreground map and output in step 19. The segmentation mask can be obtained by assigning 255 to all shape pixels in macro-blocks where corresponding value of the foreground map is 1, and assigning 0 to all shape pixels in macro-blocks where corresponding value of the foreground map is 0.

In the third and the modified third embodiments, 255 and 0 have been used as the alpha values. The values 255 and 0 are examples for the segmentation mask representation which was described in the related art. The alpha value may take any other value according to a representation method of the segmentation mask.

As mentioned above, according to the present invention described with the third and the modified third embodiments, macro-block approximation is performed for a core part of an object and for a part surrounding the core part. In the macro-block approximation, when the number of the shape pixels of the foreground region is larger than a predetermined value in a macro-block, the macro-block is regarded as being included in the foreground region. Therefore, in comparison with a normal shape coding method, according to these embodiments, amount of shape coding bits can be reduced since the segmentation mask can be obtained only by specifying the foreground for each macro-block. According to an experiment, the amount of shape coding bits is reduced to $1/5$–$1/10$ in comparison with a conventional method.

In addition, the erosion of the foreground object can be decreased.

Fourth Embodiment

Next, the fourth embodiment will be described. This embodiment corresponds to the second object of the present invention similar to the third embodiment.

Figure 16:
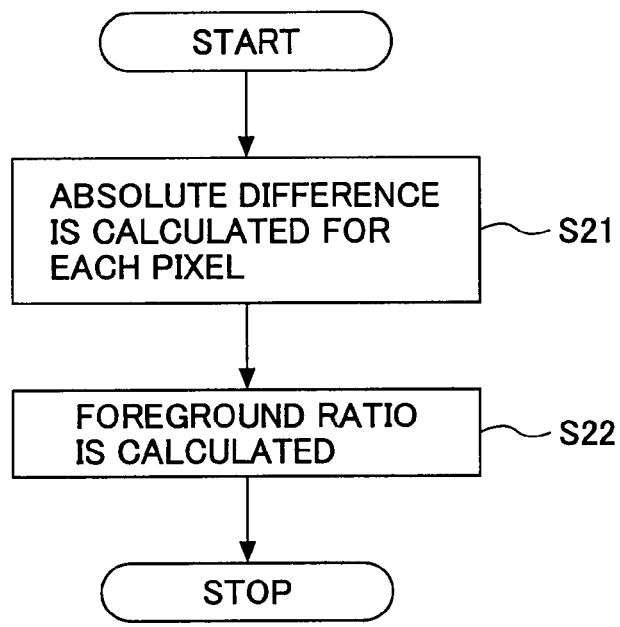
FIG. 16 is a figure for explaining the principle of the present invention for a fourth embodiment.

First, the principle of the present invention for the fourth embodiment will be described with reference to FIG. 16.

The present invention is a foreground segmentation mask extraction method for extracting a moving region which reflects a moving object by using a difference image between a background image which is obtained beforehand and an arbitrary original image.

First, an absolute difference image is obtained and output by calculating an absolute difference between the background image and the arbitrary original image for each pixel in step 21. Next, a foreground ratio is calculated and the segmentation mask is generated in step 22. The foreground ratio is a ratio of the size of the segmentation mask to the size of the arbitrary original image.

Next, the fourth embodiment will be described more specifically.

Figure 17:
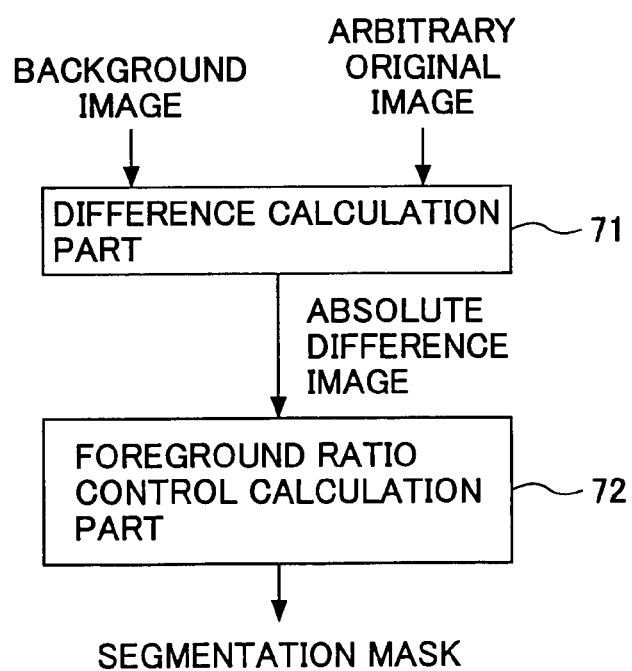
FIG. 17 is a block diagram of the segmentation mask extraction apparatus according to the fourth embodiment of the present invention.

FIG. 17 is a block diagram of the segmentation mask extraction apparatus according to the fourth embodiment of the present invention.

The segmentation mask extraction apparatus shown in the figure includes a difference calculation part 71 and a foreground ratio control calculation part 72.

The difference calculation part 71 calculates an absolute difference value between the background image and the arbitrary original image for each pixel, and outputs the absolute differences to the foreground ratio control calculation part 72 as an absolute difference image.

The foreground ratio control calculation part 72 calculates the segmentation mask of an arbitrary foreground ratio (which is a ratio of the size of the segmentation mask to the size of the image). The foreground ratio control calculation part 72 calculates the segmentation mask by performing the macro-block approximation.

The macro-block approximation for the foreground shape according to the fourth embodiment will be described with reference to FIG. 11C.

First, macro-block approximation is performed by using a first predetermined value, wherein, when an after-mentioned energy value of a macro-block is larger than the first predetermined value, the macro-block is regarded as the foreground. As mentioned before, this processing is called an initial macro-block approximation. In FIG. 11(C), the region which is obtained by the initial macro-block approximation is represented as a first macro-block approximated region. In addition, the similar processing is performed with a second predetermined value for macro-blocks which are close to each macro-block (for example, four neighborhoods of top and bottom, and right and left) which has been judged as the foreground. As mentioned above, this processing is called an extended macro-block approximation. In FIG. 11(C), the region which is obtained by the extended macro-block approximation is represented as a second macro-block approximated region.

In the extended macro-block approximation, four neighborhoods around each macro-block which is approximated by the initial macro-block approximation.

The initial macro-block approximation and the extended macro-block approximation are repeated until the foreground macro-blocks exceed a maximum foreground ratio Th3. When the maximum foreground ratio Th3 is exceeded, the region which is judged as the foreground in the next previous process is regarded as the final foreground.

Figure 18:
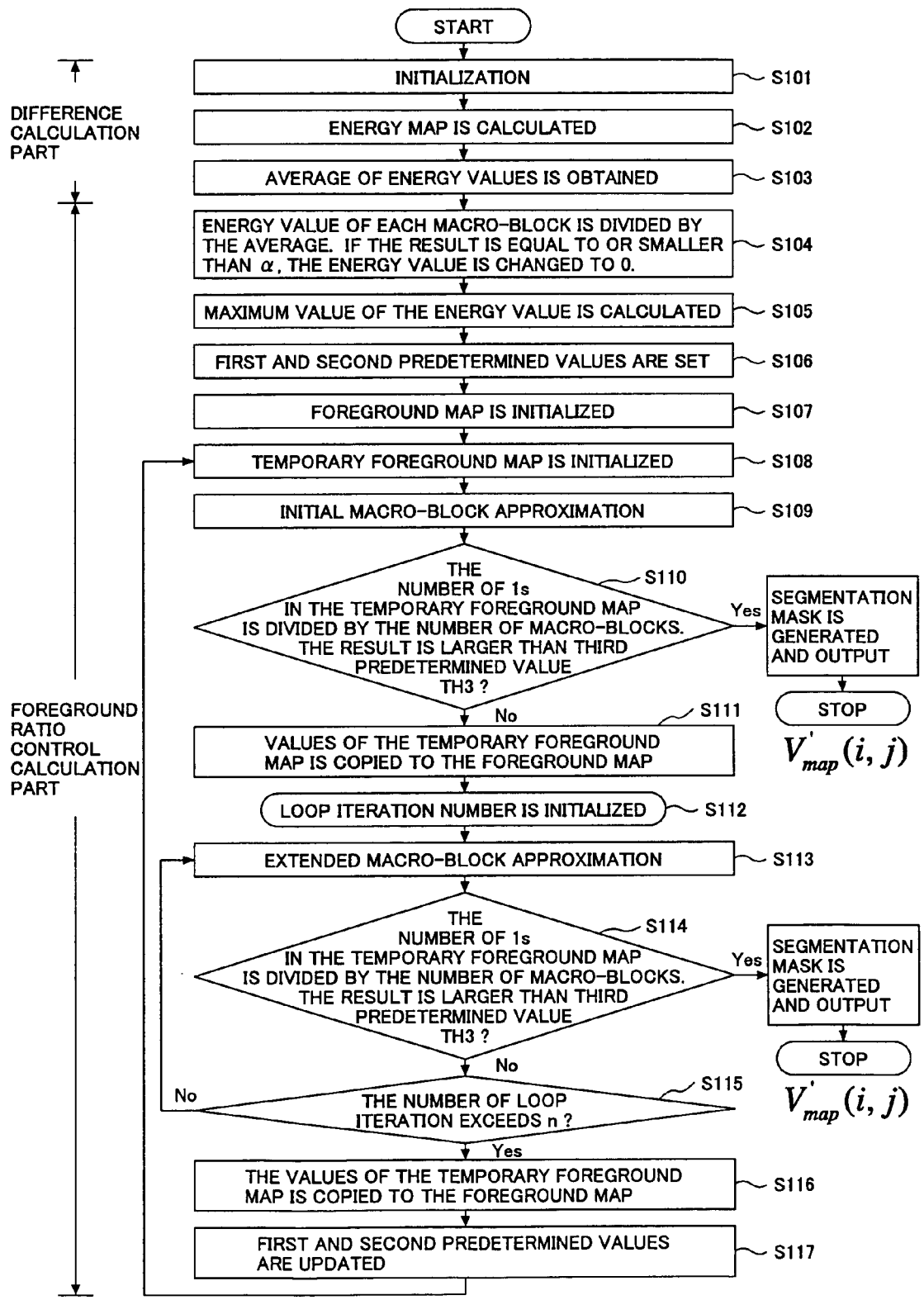
FIG. 18 is a flowchart showing processes by a difference calculation part and a foreground ratio control calculation part.

FIG. 18 is a flowchart showing the processes by the difference calculation part 71 and the foreground ratio control calculation part 72. In the beginning, notation which is used in the after-mentioned description will be described.

(i,j) denotes a position of an arbitrary macro-block. "i" and "j" may take values of $0 \leq j \leq h/s-1$, $0 \leq i \leq w/s-1$, where the size of a macro-block is s pixels×s pixels, the size of an image is vertical length h pixels×horizontal length w pixels. (l, m) denotes coordinate values in an macro-block, and may take values of $0 \leq l \leq s-1$, $0 \leq m \leq s-1$.

E(i, j): an energy map representing an energy value of an macro-block at coordinates (i, j) in the difference image;
N: the number of pixels in a macro-block (s×s);
If(l, m): a pixel value at coordinates (l, m) in a macro-block at coordinates (i, j) in an arbitrary image;
Is(l, m): a pixel value at coordinates (l, m) in a macro-block at coordinates (i, j) in the background image;
Eave: an average value of the energy values of macro-blocks in the difference image;
M: the number of macro-blocks in the difference image;
Emax: the maximum energy value in the difference image;
MAX( ): a function for obtaining the maximum value from a sequence which is parenthesized;
Th1: a first predetermined value used for macro-block approximation;
Th2: a second predetermined value used for macro-block approximation;
Vmap(i, j): a foreground map at coordinates (i, j), having 1 for a foreground macro-block and 0 for other macro-blocks;
V'map(i, j): a foreground temporary map at coordinates (i, j), having 1 for a foreground macro-block and 0 for other macro-blocks;
Count( ): a function for obtaining the number of 1s which are parenthesized;
Th3: a third predetermined value, also called a maximum foreground ratio;
kstep: a value which is subtracted from a maximum value;
In the following, the flowchart will be described.

step 101) Initialization is performed. More specifically, the difference image is divided into macro-blocks each of which macro-block is s pixels×s pixels and the energy map is initialized by storing 0 for each macro-block (E(i, j)=0). In addition, the third predetermined value Th3 and the parameter kstep are initialized, for example, as follows:

kstep=1, Th3=0.15 step 102) Each energy map is calculated. The sum of absolute difference values between the background image and an arbitrary original image in an macro-block for each pixel is calculated. Then, the energy value of the macro-block is calculated by dividing the sum by the number of pixels (N) in the macro-block. In this specification, the values obtained by the following equations are called the energy value.

$$E(i, j) = \frac{1}{N} \Sigma |(I_f(l, m) - I_S(l, m)|$$

Or, the value which is obtained by the following equation can be used as the energy value, where the sum of the square root of a square of the difference is obtained, and is divided by the number of pixels in the macro-block.

$$E(i, j) = \frac{1}{N} \Sigma \sqrt{\{(I_f(l, m) - I_S(l, m)\}^2}$$

step 103) An average of energy values of macro-blocks is obtained.

$$E_{ave} = \frac{1}{M} \Sigma E(i, j)$$

step 104) The energy value of each macro-block is divided by the average of the energy values. If the result is equal to or smaller than α ($\alpha \geq 1.0$), the energy value of the macro-block is changed to 0.

$$\text{if } \left(\frac{E(i, j)}{E_{ave}} \leq \alpha\right) E(i, j) = 0$$

step 105) The maximum value of the energy is calculated as follows:

Emax=MAX(E(i, j))

step 106) The first predetermined value Th1 and the second predetermined value Th2 are set. The first predetermined value Th1 is set as the maximum value of the energy value, and the second predetermined value Th2 is set as a value obtained by dividing the first predetermined value Th1 by 2. (The second predetermined value Th2 can take any value as long as it is smaller than the first predetermined value Th1.)

Th1=Emax, Th2=Th1/2 step 107) The foreground map is initialized.

Vmap(i, j)=0 step 108) The temporary foreground map is initialized.

V'map(i, j)=0 step 109) The initial macro-block approximation is performed. 1 is assigned to the temporary foreground map for every macro-block where the energy value is equal to or more than the first predetermined value Th1.

if (E(i, j)≧Th1) V'map(i, j)=1 step 110) The number of 1s in the temporary foreground map is counted. When a value obtained by dividing the result by the number of macro-blocks is larger than the third predetermined value Th3, the final segmentation mask is generated and output according to the values of the foreground map such that all processes ends. The final segmentation mask can be obtained by assigning 255 to all shape pixels in macro-blocks where corresponding foreground map is 1 and assigning 0 to all shape pixels in macro-blocks where corresponding foreground map is 0.

if (Count(V'map(i, j)/M≧Th3)) END step 111) The values of the temporary foreground map is copied to the foreground map.

Vmap(i, j)=V'map(i, j)

step 112) Entering a loop where the extended macro-block approximation is performed n times at the maximum.

I=0 step 113) The extended macro-block approximation is performed. More specifically, for macro-blocks close to (more specifically, next to or adjacent to) a macro-block where corresponding temporary foreground map has 1, each macro-block which has the energy value equal to or larger than the second predetermined value Th2 is regarded as the foreground and 1 is assigned to the corresponding temporary foreground map.

if (V'map(i, j−1)=1∪V'map(i, j+1)=1∪V'map(i+1, j)=1∪V'map(i−1, j)=1)

if (E(i, j)=≧Th2) V'map(i, j)=1 step 114) The number of 1s in the temporary foreground map is calculated. When a value obtained by dividing the result by the number of macro-blocks is larger than the third predetermined value Th3, the final segmentation mask is generated and output according to the values of the foreground map such that all processes ends.

if (Count(V'map(i, j)/M≧Th3)) END step 115) Exiting from the loop of the extended macro-block approximation if the number of loop iteration exceeds n. If the number does not exceeds n, the process moves to step 113.

I++, if (I<n)

step 116) The values of the temporary foreground map is copied to the foreground map.

Vmap(i, j)=V'map(i, j)

step 117) The first predetermined value Th1 and the second predetermined value Th2 are updated as follows:

Th1=Emax−kstep, Th2=Th1/2

The processes from the step 108 to the step 117 are iterated. In the above-mentioned processes, when the foreground ratio becomes larger than the third predetermined value, the loop from the step 109 to the step 117 is broken and the process ends after outputting the segmentation mask.

Considering a case that the foreground ratio does not become larger than the third predetermined value, the process may exits the loop when the first predetermined value becomes smaller than a value, then, the process may ends after outputting the segmentation mask at the time.

As mentioned above, according to the present invention, since the shape is simplified, the amount of shape coding bits can be decreased in comparison with the object coding which uses arbitrary shape coding in MPEG-4 coding.

In addition, since there is no hole in an extracted object, a good-looking object can be provided.

When the foreground ratio is too large, the amount of shape coding bits increases generally. However, according to the present invention, since the foreground ratio can be restricted to a value smaller than a predetermined value, the amount of coding bits can be decreased for MPEG-4 coding.

Fifth Embodiment

In the following, the fifth embodiment will be described. This embodiment also corresponds to the second object of the present invention.

Figure 19:
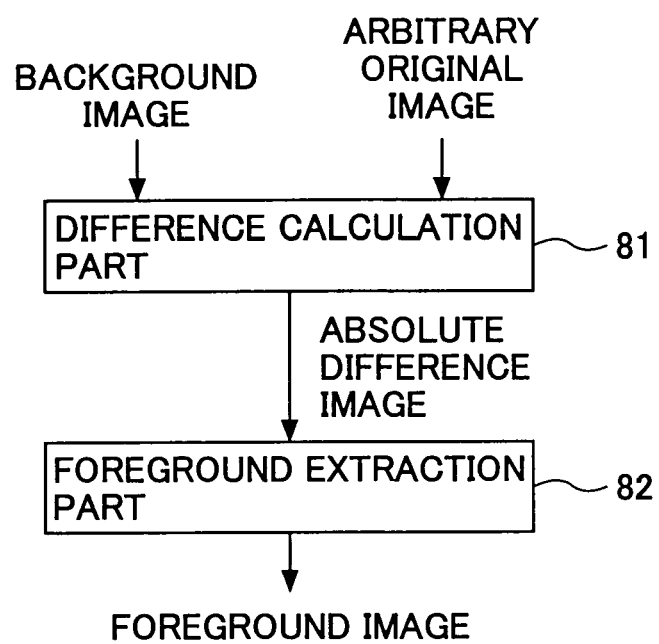
FIG. 19 is a block diagram of the segmentation mask extraction apparatus according to a fifth embodiment of the present invention.

FIG. 19 is a block diagram of the segmentation mask extraction apparatus according to the fifth embodiment. The segmentation mask extraction apparatus includes a difference calculation part 81 and a foreground extraction part 82.

In this configuration, the difference calculation part 81 calculates an absolute difference value for each pixel between the background image and the arbitrary original image, and outputs an absolute difference image. The foreground extraction part 82 receives the absolute difference image and calculates the segmentation mask.

The macro-block approximation of the foreground shape in the fifth embodiment is similar to that described with reference to FIG. 11C. As with the fourth embodiment, the initial macro-block approximation is performed with a first predetermined value on the basis of the energy value of an macro-block, and the extended macro-block approximation is performed with a second predetermined value. However, in the fifth embodiment, the processing using the maximum foreground ratio (Th3) is not performed. That is, the processing of the fifth embodiment is almost the same as that of the third embodiment except that the former uses the energy value and may perform the extended macro-block approximation a plurality of times.

Figure 20:
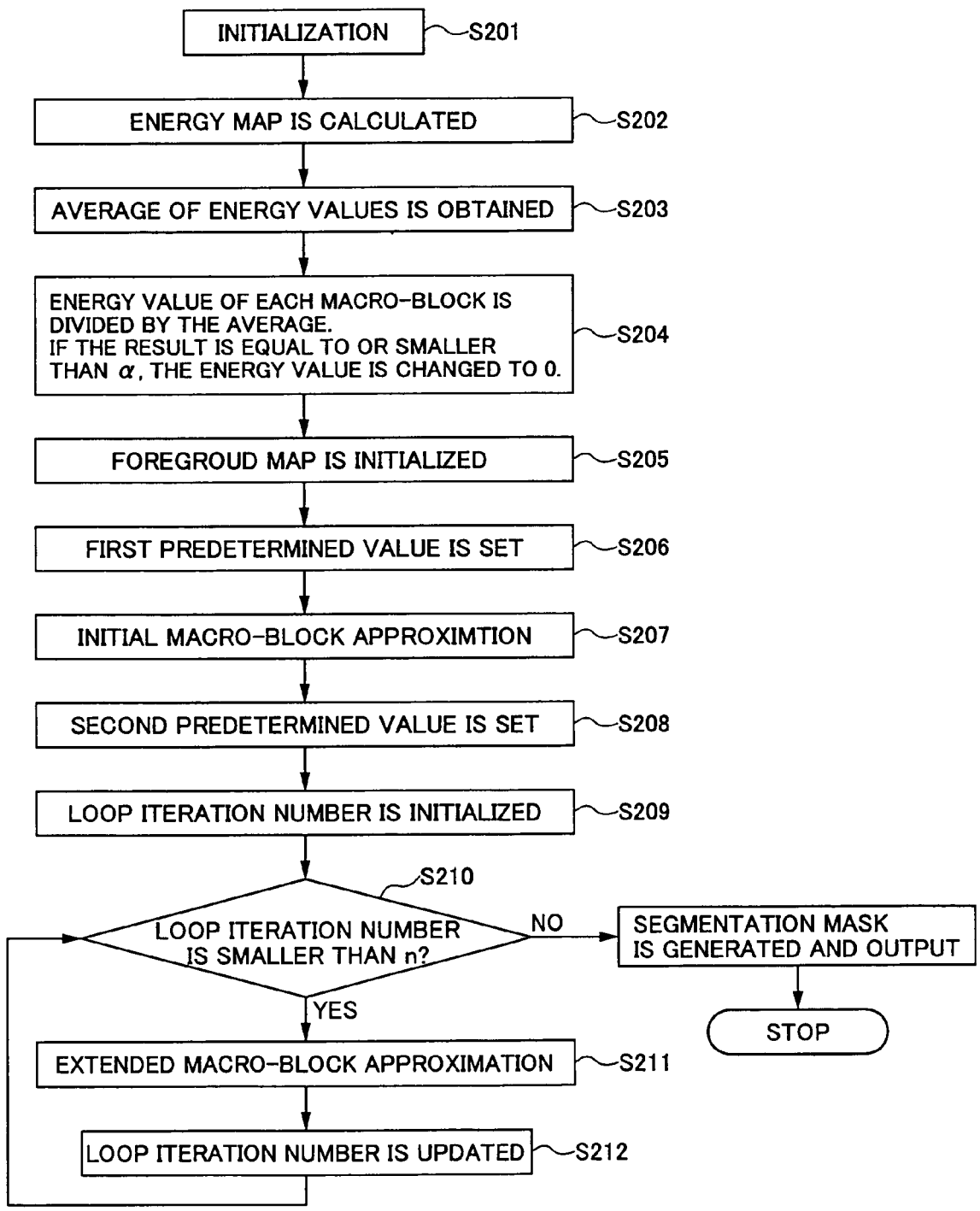
FIG. 20 is a flowchart showing processes by a difference calculation part and a foreground extraction part.

FIG. 20 is a flowchart showing the processes of the difference calculation part 81 and the foreground extraction part 82 of the fifth embodiment. In the beginning, notation which is used in the after-mentioned description will be described.

(i,j) denotes a position of an arbitrary macro-block. "i" and "j" may take values of $0 \leq j \leq h/s-1$, $0 \leq i \leq w/s-1$, where the size of a macro-block is s pixels×s pixels, the size of an image is vertical length h pixels×horizontal length w pixels. (l, m) denotes coordinate values in an macro-block, and may take values of $0 \leq l \leq s-1$, $0 \leq m \leq s-1$.

E(i, j): an energy map representing an energy value of an macro-block at coordinates (i, j) in the difference image;

N: the number of pixels in a macro-block (s×s);

If(l, m): a pixel value at coordinates (l, m) in a macro-block at coordinates (i, j) in an arbitrary image;

Is(l, m): a pixel value at coordinates (l, m) in a macro-block at coordinates (i, j) in the background image;

Eave: an average value of the energy values of macro-blocks in the difference image;
M: the number of macro-blocks in the difference image;
Emax: the maximum energy value in the difference image;
Th1': a first predetermined value used for macro-block approximation;
Th2': a second predetermined value used for macro-block approximation;
Vmap(i, j): a foreground map at coordinates (i, j), having 1 for a foreground macro-block and 0 for other macro-blocks;
In the following, the flowchart will be described.

step 201) Initialization is performed. More specifically, the difference image is divided into macro-blocks, and the energy map is initialized by storing 0 for each macro-block.

$E(i, j)=0$ step 202) Each energy map is calculated. The sum of absolute difference values between the background image and an arbitrary original image in an macro-block is calculated. Then, the energy value of the macro-block is calculated by dividing the sum by the number of pixels (256 when a macro-block of 16 pixels×16 pixels is used) in the macro-block. Or, a value can be used as the energy value, where the sum of the square root of a square of the difference is obtained, and is divided by the number of pixels in the macro-block.

$$E(i, j) = \frac{1}{N}\Sigma|(I_f(l, m) - I_S(l, m)|$$

or $$E(i, j) = \frac{1}{N}\Sigma\sqrt{\{(I_f(l, m) - I_S(l, m))\}^2}$$

step 203) An average of energy values of macro-blocks is obtained.

$$E_{ave} = \frac{1}{M}\Sigma E(i, j)$$

step 204) The energy value of each macro-block is divided by the average of the energy values. If the result is equal to or smaller than α (Δ≧1.0), the energy value of the macro-block is changed to 0.

$$\text{if }\left(\frac{E(i, j)}{E_{ave}} \leq \alpha\right) E(i, j) = 0$$

step 205) The foreground map is initialized.

$Vmap(i, j)=0$ step 206) The first predetermined value Th1' is set. For example, Th1'=20.

step 207) The initial macro-block approximation is performed by using the first predetermined value Th1'. 1 is assigned to the foreground map for every macro-block where the energy value is equal to or more than the first predetermined value Th1'.

if $(E(i, j) \geq Th1')$ $V'map(i, j)=1$

If every macro-block does not have a energy value equal to or larger than Th1', the foreground is not extracted.

step 208) The second predetermined value Th2' is set. For example, Th2'=Th1'/4.

step 209) The number of loop iteration is initialized.

k=0 steps 210–212) The extended macro-block approximation is performed n times by using the second predetermined value Th2' for n times. In the extended macro-block approximation, for macro-blocks close to a macro-block where corresponding foreground map has 1 according to the initial macro-block approximation, each macro-block which has the energy value equal to or larger than the second predetermined value Th2' is regarded as the foreground and 1 is assigned to the corresponding foreground map. The calculation method is the same as that of the fourth embodiment.

If the number of loop iteration exceeds n, the loop is broken and the segmentation mask is generated and output. Then, the process ends. The method for obtaining the segmentation mask from the foreground map is the same as that of the fourth embodiment.

According to the fifth embodiment, as with the third and fourth embodiments, since the shape is simplified, the amount of shape coding bits can be decreased in comparison with the object coding which uses arbitrary shape coding in MPEG-4 coding.

In addition, since there is no hole in an extracted object, a good-looking object can be provided.

The processes of the above-mentioned embodiments can be realized by programs. The program can be stored in a disk device which may be connected to a computer and can be stored a transportable recording medium such as a floppy disk, CD-ROM and the like. The present invention can be realized by installing the program to a computer.

Figure 21:
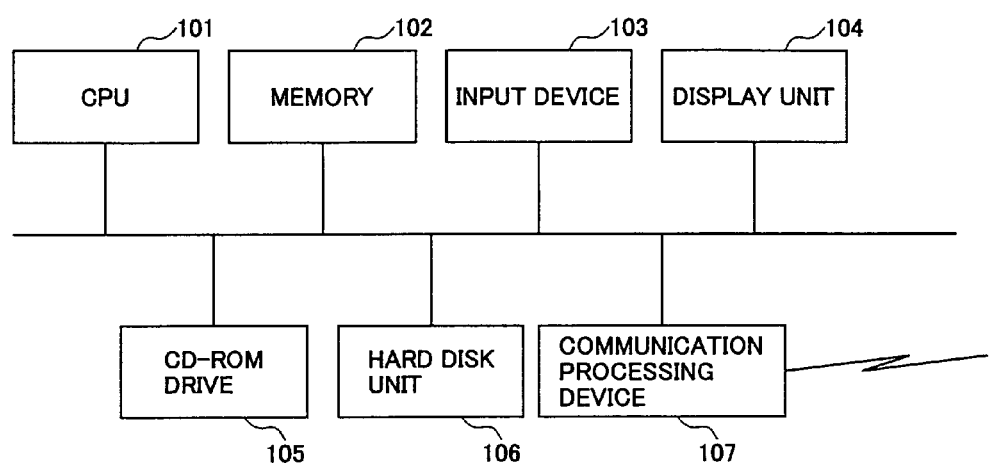
FIG. 21 shows a configuration example of a computer.

A configuration example of a computer which executes the program for each embodiment is shown in FIG. 21. This computer includes a CPU (central processing unit) 101, a memory 102, an input device 103, a display unit 104, a CD-ROM drive 105, a hard disk unit 106 and a communication processing device 107. CPU 101 controls the whole. The memory 102 stores data and programs which is processed in the CPU 101. The input device 103 is a device for inputting data such as a keyboard and a mouse. The CD-ROM drive 105 drives a CD-ROM, and reads and writes. The hard disk drive 106 stores data and programs. The computer can communicate with another computer by the communication processing device 107 via a network. A program for executing the processes of the present invention may be preinstalled in a computer, or, is stored in a CR-ROM and the like so that the program is loaded into the hard disk 106 via the CD-ROM drive 105. When the program is launched, a part of the program is extended to the memory 102 and the process is executed.

The present invention is not limited to the specifically disclosed embodiments, and variations and modifications may be made without departing from the scope of the invention.

What is claimed is:

1. A foreground object and background sprite separation and extraction method for extracting a foreground object and a background sprite, comprising the steps of:
   obtaining a global motion for transforming a coordinate system between a reference frame and a frame for each of frames in a moving image;

mapping an original image corresponding to said frame into a reference coordinate system for said each of frames by using said global motion, and obtaining a pixel value at a point in said reference coordinate system from pixel values of pixels which exist in the same point;

generating a provisional sprite where foreground objects are deleted;

cutting out a first image from said provisional sprite by using said global motion;

obtaining a difference image between said first image and said original image;

extracting, with the provisional sprite, a foreground object image as a region in said difference image where each difference value in the region is equal to or higher than a threshold, and an other region as a background image;

mapping said background image to said reference coordinate system by using said global motion for said each of frames by inserting a new pixel in a point where a pixel value is not yet decided, or by overwriting a pixel, for generating, with the provisional sprite, and outputting a background sprite without the foreground objects.

2. The foreground object and background sprite separation and extraction method as claimed in claim 1, further comprising the steps of:

cutting out a second image from said background sprite by using said global motion;

obtaining a difference image between said second image and said original image;

extracting a foreground object image as a region in said difference image where each difference value in the region is equal to or higher than a threshold.

3. The method of claim 1, wherein the foreground object image is automatically extractable without a chroma key, manual processing is not required, and outline information of the foreground object is obtainable.

4. The method of claim 3, wherein the background sprite is a good-quality or clear background sprite.

5. The method of claim 1, wherein the background sprite is a good-quality or clear background sprite.

6. A foreground object and background sprite separation and extraction apparatus for extracting a foreground object and a background sprite, comprising:

means for obtaining a global motion for transforming a coordinate system between a reference frame and a frame for each of frames in a moving image;

means for mapping an original image corresponding to said frame into a reference coordinate system for said each of frames by using said global motion, and obtaining a pixel value at a point in said reference coordinate system from pixel values of pixels which exist in the same point;

means for generating a provisional sprite where foreground objects are deleted;

means for cutting out a first image from said provisional sprite by using said global motion;

means for obtaining a difference image between said first image and said original image;

means for extracting, with the provisional sprite, a foreground object image as a region in said difference image where each difference value in the region is equal to or higher than a threshold, and extracting an other region as a background image;

means for mapping said background image to said reference coordinate system by using said global motion for said each of frames by inserting a new pixel in a point where a pixel value is not yet decided, or by overwriting a pixel, for generating, with the provisional sprite, and outputting a background sprite without the foreground objects.

7. The foreground object and background sprite separation and extraction apparatus as claimed in claim 6, further comprising:

means for cutting out a second image from said background sprite by using said global motion;

means for obtaining a difference image between said second image and said original image;

means for extracting a foreground object image as a region in said difference image where each difference value in the region is equal to or higher than a threshold.

8. The apparatus of claim 6, wherein the foreground object image is automatically extractable without a chroma key, manual processing is not required, and outline information of the foreground object is obtainable.

9. The apparatus of claim 8, wherein the background sprite is a good-quality or clear background sprite.

10. The apparatus of claim 6, wherein the background sprite is a good-quality or clear background sprite.

11. A computer readable medium storing program code for causing a computer to extract a foreground object and a background sprite, comprising:

program code means for obtaining a global motion for transforming a coordinate system between a reference frame and a frame for each of frames in a moving image;

program code means for mapping an original image corresponding to said frame into a reference coordinate system for said each of frames by using said global motion, and obtaining a pixel value at a point in said reference coordinate system from pixel values of pixels which exist in the same point;

program code means for generating a provisional sprite where foreground objects are deleted;

program code means for cutting out a first image from said provisional sprite by using said global motion;

program code means for obtaining a difference image between said first image and said original image;

program code means for extracting, with the provisional sprite, a foreground object image as a region in said difference image where each difference value in the region is equal to or higher than a threshold, and an other region as a background image;

program code means for mapping said background image to said reference coordinate system by using said global motion for said each of frames by inserting a new pixel in a point where a pixel value is not yet decided, or by overwriting a pixel, for generating, with the provisional sprite, and outputting a background sprite without the foreground objects.

12. The computer readable medium as claimed in claim 11, further comprising:

program code means for cutting out a second image from said background sprite by using said global motion;

program code means for obtaining a difference image between said second image and said original image;

program code means for extracting a foreground object image as a region in said difference image where each difference value in the region is equal to or higher than a threshold.

13. The computer readable medium of claim 11, wherein the foreground object image is automatically extractable without a chroma key, manual processing is not required, and outline information of the foreground object is obtainable.

14. The computer readable medium of claim 13, wherein the background sprite is a good-quality or clear background sprite.

15. The computer readable medium of claim 11, wherein the background sprite is a good-quality or clear background sprite.

16. A segmentation mask extraction method in object coding in moving image coding, comprising the steps of:
receiving a foreground mask image where a foreground part is represented by first value and a background part is represented by a second value;
providing a first value as an alpha value to all shape pixels in each of first macro-blocks when the number of pixels of said foreground part in said first macro-block is equal to or larger than a first predetermined value n (n≧1);
providing said first value as said alpha value to all shape pixels in each of second macroblocks when the number of pixels of said foreground part in said second macro-block is equal to or larger than a second predetermined value m (m<n), wherein said second macro-block is close to said first macro-block where said first value is provided; and
outputting said segmentation mask.

17. The segmentation mask extraction method as claimed in claim 16, further comprising the steps of:
receiving each of third macro-blocks which has been determined as said background part; and
providing said first value to said third macro-block when a difference image between a background image and an original image which correspond to said third macro-block includes a pixel which has a difference value equal to or larger than a threshold.

18. The method of claim 16, wherein the two-stage macro-block approximation for extracting a segmentation mask provides that there is no hole in an extracted object.

19. The method of claim 18, wherein the two-stage macro-block based shape approximation reduces macro-block shape information and erosion of the foreground part.

20. The method of claim 16, wherein two-stage the macro-block based shape approximation reduces macro-block shape information and erosion of the foreground part.

21. A segmentation mask extraction method in object coding in moving image coding, comprising the steps of:
receiving a foreground mask image;
generating a number map by calculating the number of pixels of a foreground part for each of macro-blocks in said foreground mask image;
initializing a foreground map;
providing a predetermined value to each of positions in said foreground map corresponding to first macro-blocks when a value of said number map corresponding to said first macro-block is equal to or larger than a first predetermined value n (n≧1);
providing said predetermined value to each of positions in said foreground map corresponding to second macro-blocks when a value of said number map corresponding to said second macro-block is equal to or larger than a second predetermined value m (m<n), wherein said second macro-block is close to said first macro-block where said predetermined value is provided; and
generating said segmentation mask from said foreground map and outputting said segmentation mask.

22. The method of claim 21, wherein the two-stage macro-block approximation for extracting a segmentation mask provides that there is no hole in an extracted object.

23. The method of claim 22, wherein the two-stage macro-block based shape approximation reduces macroblock shape information and erosion of the foreground part.

24. The method of claim 21, wherein the two-stage macro-block based shape approximation reduces macro-block shape information and erosion of the foreground part.

25. A segmentation mask extraction apparatus in object coding in moving image coding, comprising:
means for receiving a foreground mask image where a foreground part is represented by a first value and a background part is represented by a second value;
first macro-block approximation means for providing a first value as an alpha value to all shape pixels in each of first macro-blocks when the number of pixels of said foreground part in said first macro-block is equal to or larger than a first predetermined value n (n≧1);
second macro-block approximation means for providing said first value as said alpha value to all shape pixels in each of second macro-blocks when the number of pixels of said foreground part in said second macro-block is equal to or larger than a second predetermined value m (m<n) wherein said second macro-block is close to said first macroblock where said first value is provided in said first macro-block approximation means; and
means for outputting said segmentation mask.

26. The segmentation mask extraction apparatus as claimed in claim 25, further comprising:
means for receiving each of third macro-blocks which has been determined a said background part; and
means for providing said first value to said third macro-block when a difference image between a background image and an original image which correspond to said third macro-block includes a pixel which has a difference value equal to or larger than a threshold.

27. A segmentation mask extraction apparatus in object coding in moving image coding, comprising the steps of:
means for receiving a foreground mask image;
means for generating a number map by calculating the number of pixels of a foreground part for each of macro-blocks in said foreground mask image;
means for initializing a foreground map;
means for providing a predetermined value to each of positions in said foreground map corresponding to first macro-blocks when a value of said number map corresponding to said first macro-block is equal to or larger than a first predetermined value n (n≧1);
means for providing said predetermined value to each of positions in said foreground map corresponding to second macro-block when a value of said number map corresponding to said second macroblock is equal to or larger than a second predetermined value m (m<n), wherein said second macro-block is close to said first macro-block where said predetermined value is provided; and
generating said segmentation mask from said foreground map and outputting aid segmentation mask.

28. A computer readable medium storing program code for causing a computer to extract a segmentation mask in object coding in moving image coding, comprising:
program code means for receiving a foreground mask image where a foreground part is represented by a first value and a background part is represented by a second value;

first macro-block approximation program code means for providing a first value as an alpha value to all shape pixels in each of first macro-blocks when the number of pixels of said foreground part in said first macro-block is equal to or larger than a first predetermined value n≧1);

second macro-block approximation program code means for providing said first value as said alpha value to all shape pixels in each of second macro-blocks when the number of pix is of said foreground part in said second macro-block is equal to or larger than a second predetermined value m (m<n), wherein said second macro-block is close to said first macro-block where said first value is provided in said first macro-block approximation program code means; and program code means for outputting said segmentation mask.

29. The computer readable medium as claimed in claim 28, further comprising:

program code means for receiving each of third macro-blocks which has been determined as said background part; and program code means for providing said first value to said third macro-block when a difference image between a background image and an original image which correspond to said third macroblock includes a pixel which has a difference value equal to or larger than a threshold.

30. A computer readable medium storing program code for causing a computer to extract a segmentation mask in object coding in moving image coding, comprising:

program code means for receiving a foreground mask image;

program code means for generating a number map by calculating the number of pixels of a foreground part for each of macro-blocks in said foreground mask image;

program code means for initializing a foreground map;

program code means for providing a predetermined value to each of positions in said foreground map corresponding to first macro-blocks when a value of said number map corresponding to said first macro-block is equal to or larger than a first predetermined value n (n≧1);

program code means for providing said predetermined value to each of positions in said foreground map corresponding to second macro-blocks when a value of said number map corresponding to said second macro-block is equal to or larger than a second predetermined value m (m<n), wherein said second macro-block is close to said first macroblock where said predetermined value is provided; and program code generating said segmentation mask from said foreground map and outputting said segmentation mask.

31. A segmentation mask extraction method for extracting a segmentation mask by using a difference image between a background image and an image, comprising the steps of:

obtaining said difference image by calculating an absolute difference between said background image and said image fox each pixel;

initializing an energy map for each macroblock of said difference image;

calculating energy values for said each macro-block;

obtaining an average of said energy values;

calculating a foreground ratio which is a ratio of the size of a foreground mask to the size of said image; and generating said segmentation mask by using said foreground ratio.

32. A segmentation mask extraction method for extracting a segmentation mask by using a difference image between a background image and an image, comprising the steps of:

obtaining said difference image by calculating an absolute difference between said background image and said image fox each pixel;

initializing an energy map for each macroblock of said difference image;

calculating energy values for said each macro-block;

obtaining an average of said energy values;

calculating a foreground ratio which is a ratio of the size of a foreground mask to the size of said image;

generating said segmentation mask by using said foreground ratio;

obtaining a divided value by dividing said energy value by said average for said each macroblock, and providing 0 as an energy value to a macro-block when said divided value is equal to or smaller than α (α≧1.0);

obtaining a maximum energy value as a first predetermined value, setting a second predetermined value which is smaller than said first predetermined value, and initializing a foreground map;

initializing a temporary foreground map;

providing a predetermined value to each macro-block position in said temporary foreground map where said energy value is equal to or larger than said first predetermined value;

counting a count number of macro-blocks where said temporary foreground map has said predetermined value;

generating said segmentation mask from said foreground map and outputting said segmentation mask if a value obtained by dividing said count number by the number of all macro-locks is larger than a third predetermined value which is predetermined, if not, copying values of said temporary foreground map to said foreground map;

iterating a providing step until a divided number obtained by dividing said count number by the number of all macro-blocks becomes larger than said third predetermined value, wherein said providing step is a step of providing said predetermined value to each macro-block position in said temporary foreground map where said energy value is equal to or larger than said second predetermined value, said each macro-block being close to a macro-block which has said predetermined value in said foreground map; and when said divided number does not become larger than said third predetermined value after iterating said providing step, copying values of said temporary foreground map to said foreground map, updating said first predetermined value and said second predetermined value, and performing said steps after said step of initializing said temporary foreground map.

33. A segmentation mask extraction apparatus for extracting a segmentation mask by using a difference image between background image and an image, comprising:

means for obtaining said difference image by calculating an absolute difference between said background image and said image for each pixel;

means for initializing an energy map for each macro-block of said difference image;

means for calculating energy values for said each macro-block;

means for obtaining an average of said energy values;

means for calculating a foreground ratio which is a ratio of the size of a foreground mask to the size of said image; and means for generating said segmentation mask by using said foreground ratio.

34. A segmentation mask extraction apparatus for extracting a segmentation mask by using a difference image between background image and an image, comprising:

means for obtaining said difference image by calculating an absolute difference between said background image and said image for each pixel;

means for initializing an energy map for each macro-block of said difference image;

means for calculating energy values for said each macro-block;

means for obtaining an average of said energy values;

means for calculating a foreground ratio which is a ratio of the size of a foreground mask to the size of said image;

means for generating said segmentation mask by using said foreground ratio;

means for obtaining a divided value by dividing said energy value by said average for said each macro-block, and providing 0 as an energy value to a macro-block when said divided value is equal to or smaller than $\alpha$ ($\alpha \geq 1.0$);

means for obtaining a maximum energy value as a first predetermined value, setting a second predetermined value which is smaller than said first predetermined value, and initializing a foreground map;

means for initializing a temporary foreground map;

means for providing a predetermined value to each macro-block position in said temporary foreground map where said energy value is equal to or larger than said first predetermined value;

means for counting a count number of macro-blocks where said temporary foreground map has said predetermined value;

means for generating said segmentation mask from said foreground map and outputting said segmentation mask if a value obtained by dividing said count number by the number of all macro-blocks is larger than a third predetermined value which is predetermined, if not, copying values of said temporary foreground map to said foreground map;

means for iterating a providing step until a divided number obtained by dividing said count number by the number of all macro-blocks becomes larger than said third predetermined value, wherein said providing step is a step of providing said predetermined value to each macro-block position in said temporary foreground map where said energy value is equal to or larger than said second predetermined value, said each macro-block being close to a macro-block which has said predetermined value in said foreground map; and means for copying values of said temporary foreground map to said foreground map, updating said first predetermined value and said second predetermined value, and performing said steps after said step of initializing said temporary foreground map, when said divided number does not become larger than said third predetermined value after iterating said providing step.

35. A computer readable medium storing program code for causing a computer to extract a segmentation mask by using a difference image between a background image and an image, comprising:

program code means for obtaining said difference image by calculating an absolute difference between said background image and said image for each pixel;

program code means for initializing an energy map for each macro-block of said difference image;

program code means for calculating energy values for said each macro-block;

program code means for obtaining an average of said energy values;

program code means for calculating a foreground ratio which is a ratio of the size of a foreground mask to the size of said image; and program code means for generating said segmentation mask by using said foreground ratio.

36. A computer readable medium storing program code for causing a computer to extract a segmentation mask by using a difference image between a background image and an image, comprising:

program code means for obtaining said difference image by calculating an absolute difference between said background image and said image for each pixel;

program code means for initializing an energy map for each macro-block of said difference image;

program code means for calculating energy values for said each macro-block;

program code means for obtaining an average of said energy values;

program code means for calculating a foreground ratio which is a ratio of the size of a foreground mask to the size of said image;

program code means for generating said segmentation mask by using said foreground ratio;

program code means for obtaining a divided value by dividing said energy value, by said average for said each macro-block, and providing 0 as an energy value to a macro-block when said divided value is equal to or smaller than $\alpha$ ($\beta \geq 1.0$);

program code means for obtaining a maximum energy value as a first predetermined value, setting a second predetermined value which is smaller than said first predetermined value, an initializing a foreground map;

program code means for initializing a temporary foreground map;

program code means for providing a predetermined value to each macro-block position in said temporary foreground map whey said energy value is equal to or larger than said first predetermined value;

program code means for counting a count number of macro-blocks where said temporary foreground map has said predetermined value;

program code means for generating said segmentation mask from said foreground map and outputting said segmentation mask if a value obtained by dividing said count number by the number of all macro-blocks is larger than a third predetermined value which is predetermined, if not, copying values of said temporary foreground map to said foreground map;

program code means for iterating a providing step until a divided number obtained by dividing said count number by the umber of all macro-blocks becomes larger than said third predetermined value, wherein said providing step is a step of providing said predetermined value to each macro-block position in said temporary foreground map where said energy value is equal to or larger than said second predetermined value, said each macro-block being close to a macro block which has said predetermined value in said foreground map; and program code means for copying values of said temporary foreground map to said foreground map, updating said first predetermined value and said second predetermined value, and performing said steps after said step of initializing said temporary foreground map, when said divided umber does not become larger than said third predetermined value after iterating said providing step.

37. A segmentation mask extraction method for extracting a segmentation mask by using a difference image between a background image and an image, comprising:
a first step of regarding each of first macro-blocks as the foreground when an energy value of said first macro-block which is obtained by said difference image is equal to or larger than a first predetermined value;
a second step of regarding each of second macro-blocks as the foreground when an energy value of said second macro-block is equal to or larger than a second predetermined value, said second macro-block being close to a macro-block which is determined as the foreground in said first step.

38. The segmentation mask extraction method as claimed in claim 37, further comprising a step of iterating said second step for predetermined times.

39. A segmentation mask extraction method for extracting a segmentation mask by using a difference image between a background image and an image, comprising the steps of:
calculating energy value of each macro-block from said difference image and calculating an average of said energy values;
obtaining a divided value by dividing said energy value by said average for said each macro-block, and providing 0 as an energy value to a macro-block when said divided value is equal to or smaller than a predetermined value;
regarding each of first macro-blocks as the foreground when said energy value of said first macro-block is equal to or larger than a first predetermined value;
iterating, predetermined times, a step of regarding each of second macro-blocks as the foreground when said energy value of said second macro-block is equal to or larger than a second predetermined value, said second macro-block being close to said first macro-block which is determined as the foreground.

40. A segmentation mask extraction apparatus for extracting a segmentation mask by using a difference image between a background image and an image, comprising:
first means for regarding each of first macro-blocks as the foreground when an energy value of said first macro-block which is obtained by said difference image is equal to or larger than a first predetermined value;
second means for regarding each of second macro-blocks as the foreground when an energy value of said second macro-block is equal to or larger than a second predetermined value, said second macro-block being close to a macro-block which is determined as the foreground in said first means.

41. The segmentation mask extraction apparatus as claimed in claim 40, further comprising means for iterating the process by said second means for predetermined times.

42. A segmentation mask extraction apparatus for extracting a segmentation mask by using a difference image between a background image and an image, comprising:
means for calculating energy values of each macro-block from said difference image and calculating an average of said energy values;
means for obtaining a divided value by dividing said energy value by said average for said each macro-block, and providing 0 as said energy value to a macro-block when said divided value is equal to or smaller than a predetermined value; means for regarding each of first macro-blocks as the foreground when said energy value of said first macro-block is equal to or larger than a first predetermined value;
means for iterating, predetermined times, a step of regarding each of second macro-blocks as the foreground when said energy value of said second macro-block is equal to or larger than a second predetermined value, said second macro-block being close to said first macro-block which is determined as the foreground.

43. A computer readable medium storing program code for causing a computer to extract a segmentation mask by using a difference image between a background image and an image, comprising:
first program code means for regarding each of first macro-blocks as the foreground when an energy value of said first macro-block which is obtained by said difference image is equal to or larger than a first predetermined value;
second program code mean for regarding each of second macro-blocks as the foreground when an energy value of said second macro-block is equal to or larger than a second predetermined value, said second macro-block being close to macro-block which is determined as the foreground in said first program code means.

44. The computer readable medium as claimed in claim 43, further comprising program code means for iterating the process by said second program code means for predetermined times.

45. A computer readable medium storing program code for causing a computer to extract a segmentation mask by using a difference image between a background image and an image, comprising:
program code means for calculating energy values of each macro-block from said difference image and calculating an average of said energy values;
program code means for obtaining a divided value by dividing said energy value by said average for said each macro-block, and providing 0 as said energy value to a macro-block when said divided value is equal to or smaller than predetermined value;
program code means for regarding each of first macro-blocks as the foreground when said energy value of said first macro-block is equal to or larger than a first predetermined value;
program code means for iterating, predetermined times, a step of regarding each of second macro-blocks as the foreground when said energy value of said second macro-block is equal to or larger than a second predetermined value, said second macro-block being close to said first macro-block which is determined as the foreground.

* * * * *

UNITED STATES PATENT AND TRADEMARK OFFICE
CERTIFICATE OF CORRECTION

PATENT NO. : 6,977,664 B1  Page 1 of 1
APPLICATION NO. : 09/667097
DATED : December 20, 2005
INVENTOR(S) : Kumi Jinzenji et al.

It is certified that error appears in the above-identified patent and that said Letters Patent is hereby corrected as shown below:

On the TITLE PAGE at (57) ABSTRACT line 8, after "when" and before "value" delete "an" and insert --a--;

On the TITLE PAGE at (57) ABSTRACT line 11, after "when" and before "value" delete "an" and insert --a--;

Column 27, line 10, change "number of pix is of said" to --number of pix is of said--;

Column 27, line 61, change "fox" to --for--;

Column 28, line 8, change "fox" to --for--;

Column 30, line 38, change "$\alpha\ (\beta \geq 1.0)$" to $\alpha\ (\alpha \geq 1.0)$--;

Column 30, line 60, change "umber" to --number--;

Column 31, line 6, change "umber" to --number-- and

Figure 20 change "FOREGROUND" to -- FOREGROUND --.

Signed and Sealed this

Twenty-sixth Day of September, 2006

JON W. DUDAS
*Director of the United States Patent and Trademark Office*